US008333907B2

(12) United States Patent
Comanzo et al.

(10) Patent No.: US 8,333,907 B2
(45) Date of Patent: Dec. 18, 2012

(54) ARTICLES USING PERSISTENT PHOSPHORS

(75) Inventors: Holly Ann Comanzo, Niskayuna, NY (US); Alok Mani Srivastava, Niskayuna, NY (US); Steven Jude Duclos, Clifton Park, NY (US); Lucas Lemar Clarke, Bradenton, FL (US); Munro Howard Sykes, Bradenton, FL (US)

(73) Assignee: UTC Fire & Security Corporation, Farmington, CT (US)

( * ) Notice: Subject to any disclaimer, the term of this patent is extended or adjusted under 35 U.S.C. 154(b) by 360 days.

(21) Appl. No.: 12/640,712

(22) Filed: Dec. 17, 2009

(65) Prior Publication Data
US 2010/0136302 A1 Jun. 3, 2010

Related U.S. Application Data

(63) Continuation-in-part of application No. 11/954,814, filed on Dec. 12, 2007, now Pat. No. 7,959,827, and a continuation-in-part of application No. 12/606,237, filed on Oct. 27, 2009, now Pat. No. 8,211,334, and a continuation-in-part of application No. 12/057,496, filed on Mar. 28, 2008, now Pat. No. 8,003,012, and a continuation-in-part of application No. 11/654,191, filed on Jan. 17, 2007, now abandoned.

(51) Int. Cl.
*C09K 11/61* (2006.01)
*C09K 11/56* (2006.01)
*C09K 11/55* (2006.01)
*C09K 11/54* (2006.01)

(52) U.S. Cl. ............ 252/301.36; 428/690; 252/301.4 H; 252/301.6 R; 252/301.6 S; 252/301.4 S

(58) Field of Classification Search ............ 252/301.36, 252/301.4 R, 301.4 H, 301.6 S, 301.6 R; 428/690
See application file for complete search history.

(56) References Cited

U.S. PATENT DOCUMENTS

| 4,631,144 A | 12/1986 | Beers et al. |
| 4,638,214 A | 1/1987 | Beers et al. |
| 5,230,831 A | 7/1993 | Srivastava |
| 5,273,681 A | 12/1993 | Srivastava |
| 5,273,732 A | 12/1993 | Srivastava et al. |

(Continued)

FOREIGN PATENT DOCUMENTS
EP 0877071 A1 11/1998
(Continued)

OTHER PUBLICATIONS

Y. Ito et al., "Luminescence properties of long-persistence silicate phosphors," Journal of Alloys and Compounds, 2006, pp. 907-910.

(Continued)

*Primary Examiner* — Carol M Koslow
(74) *Attorney, Agent, or Firm* — MH2 Technology Law Group

(57) ABSTRACT

An article of manufacture that comprises a structure that is a security system device (or portion thereof) or a fire system device (or portion), where a persistent phosphor and/or a persistent phosphor blend is either integrated in a coating on the structure; applied on the structure; or integrated in the structure, wherein the persistent phosphor comprises certain phosphors or phosphor blends. The present invention has been described in terms of specific embodiment(s), and it is recognized that equivalents, alternatives, and modifications, aside from those expressly stated, are possible and within the scope of the appending claims.

9 Claims, 16 Drawing Sheets

U.S. PATENT DOCUMENTS

| | | | |
|---|---|---|---|
| 5,312,612 A | 5/1994 | Srivastava et al. | |
| 5,874,491 A | 2/1999 | Anders | |
| 5,951,915 A * | 9/1999 | Hase et al. | 252/301.4 F |
| 5,961,072 A | 10/1999 | Bodle | |
| 6,005,024 A | 12/1999 | Anders et al. | |
| 6,074,739 A | 6/2000 | Katagiri | |
| 6,123,871 A | 9/2000 | Carroll | |
| 6,190,577 B1 | 2/2001 | Hase et al. | |
| 6,210,605 B1 | 4/2001 | Srivastava et al. | |
| 6,246,744 B1 | 6/2001 | Duclos et al. | |
| 6,252,254 B1 | 6/2001 | Soules et al. | |
| 6,255,670 B1 | 7/2001 | Srivastava et al. | |
| 6,276,634 B1 | 8/2001 | Bodle | |
| 6,278,135 B1 | 8/2001 | Srivastava et al. | |
| 6,280,655 B1 | 8/2001 | Xu et al. | |
| 6,294,800 B1 | 9/2001 | Duggal et al. | |
| 6,302,959 B2 | 10/2001 | Srivastava et al. | |
| 6,357,889 B1 | 3/2002 | Duggal et al. | |
| 6,358,441 B2 | 3/2002 | Duclos et al. | |
| 6,366,033 B1 | 4/2002 | Greci et al. | |
| 6,375,864 B1 | 4/2002 | Phillips et al. | |
| 6,402,987 B1 | 6/2002 | Srivastava et al. | |
| 6,429,583 B1 | 8/2002 | Levinson et al. | |
| 6,436,313 B1 | 8/2002 | Srivastava et al. | |
| 6,466,135 B1 | 10/2002 | Srivastava et al. | |
| 6,469,322 B1 | 10/2002 | Srivastava et al. | |
| 6,479,936 B1 | 11/2002 | Martinez | |
| 6,501,100 B1 | 12/2002 | Srivastava et al. | |
| 6,515,314 B1 | 2/2003 | Duggal et al. | |
| 6,522,065 B1 | 2/2003 | Srivastava et al. | |
| 6,538,371 B1 | 3/2003 | Duggal et al. | |
| 6,555,958 B1 | 4/2003 | Srivastava et al. | |
| 6,580,097 B1 | 6/2003 | Soules et al. | |
| 6,596,195 B2 | 7/2003 | Srivastava et al. | |
| 6,613,137 B2 | 9/2003 | Egger et al. | |
| 6,616,862 B2 | 9/2003 | Srivastava et al. | |
| 6,621,211 B1 | 9/2003 | Srivastava et al. | |
| 6,630,077 B2 | 10/2003 | Shiang et al. | |
| 6,653,765 B1 | 11/2003 | Levinson et al. | |
| 6,685,852 B2 | 2/2004 | Setlur et al. | |
| 6,692,667 B2 | 2/2004 | Kyeng-Jung | |
| 6,696,126 B1 | 2/2004 | Fischer et al. | |
| 6,700,322 B1 | 3/2004 | Duggal et al. | |
| 6,730,918 B2 | 5/2004 | Srivastava et al. | |
| 6,761,837 B2 | 7/2004 | Comanzo et al. | |
| 6,777,724 B2 | 8/2004 | Duggal et al. | |
| 6,809,471 B2 | 10/2004 | Setlur et al. | |
| 6,809,781 B2 | 10/2004 | Setlur et al. | |
| 6,844,671 B2 | 1/2005 | Setlur et al. | |
| 6,847,162 B2 | 1/2005 | Duggal et al. | |
| 6,853,131 B2 | 2/2005 | Srivastava et al. | |
| 6,867,536 B2 | 3/2005 | Srivastava et al. | |
| 6,879,091 B2 | 4/2005 | Venugopal et al. | |
| 6,911,159 B2 | 6/2005 | Rogers et al. | |
| 6,917,154 B2 | 7/2005 | Bolta et al. | |
| 6,936,857 B2 | 8/2005 | Doxsee et al. | |
| 6,939,481 B2 | 9/2005 | Srivastava et al. | |
| 6,965,193 B2 | 11/2005 | Srivastava et al. | |
| 6,969,475 B2 | 11/2005 | Hyland, Jr. et al. | |
| 6,982,046 B2 | 1/2006 | Srivastava et al. | |
| 7,015,510 B2 | 3/2006 | Srivastava et al. | |
| 7,019,452 B2 | 3/2006 | Srivastava et al. | |
| 7,022,263 B2 | 4/2006 | Comanzo et al. | |
| 7,024,781 B1 | 4/2006 | Cowie | |
| 7,026,755 B2 | 4/2006 | Setlur et al. | |
| 7,056,451 B2 | 6/2006 | Manivannan et al. | |
| 7,056,849 B2 | 6/2006 | Wan et al. | |
| 7,077,978 B2 | 7/2006 | Setlur et al. | |
| 7,077,980 B2 | 7/2006 | Ramachandran et al. | |
| 7,094,362 B2 | 8/2006 | Setlur et al. | |
| 7,119,488 B2 | 10/2006 | Soules et al. | |
| 7,122,128 B2 | 10/2006 | Comanzo et al. | |
| 7,128,849 B2 | 10/2006 | Setlur et al. | |
| 7,179,402 B2 | 2/2007 | Srivastava et al. | |
| 7,252,787 B2 | 8/2007 | Hancu et al. | |
| 7,267,785 B2 | 9/2007 | Srivastava et al. | |
| 7,311,859 B1 | 12/2007 | Loureiro et al. | |
| 7,608,829 B2 | 10/2009 | Loureiro et al. | |
| 7,625,502 B2 | 12/2009 | Clothier et al. | |
| 7,959,827 B2 * | 6/2011 | Comanzo et al. | 252/301.4 R |
| 8,003,012 B2 * | 8/2011 | Comanzo et al. | 252/301.4 R |
| 2004/0032204 A1 | 2/2004 | Wang et al. | |
| 2004/0055483 A1 * | 3/2004 | Thollin | 101/35 |
| 2005/0158526 A1 * | 7/2005 | Ino et al. | 428/207 |
| 2005/0212397 A1 | 9/2005 | Murazaki et al. | |
| 2006/0222757 A1 | 10/2006 | Loureiro et al. | |
| 2007/0131866 A1 | 6/2007 | Srivastava et al. | |
| 2011/0095676 A1 * | 4/2011 | Srivastava et al. | 313/503 |

FOREIGN PATENT DOCUMENTS

| | | |
|---|---|---|
| EP | 1661964 A1 | 5/2006 |
| GB | 766043 | 1/1957 |
| WO | 9950372 A1 | 10/1999 |

OTHER PUBLICATIONS

Y. Miyamoto et al., "An Orange-Emitting, Long-Persistent Phosphor, Ca2Si5N8:Eu2+, Tm3+," Journal of the Electrochemical Society, 2009, vol. 156, No. 9, pp. J235-J241.

S. Yanbin et al., "Synthesis of SrAl2O4:Eu2+, Dy3+ phosphors by the coupling route of microemulsion with coprecipitation method," Rare Metals, vol. 25, No. 6, Dec. 2006, pp. 615-619.

C. Lu et al., "Nanosized strotium aluminate phosphors prepared via a reverse microemulsion route," Materials Science and Eigineering B, vol. 140, 2007, pp. 218-221.

T. Aitasalo et al., "Persistent luminescence phenomena in materials doped with rare earth ions," Journal of solid State Chemistry, vol. 171, 2003, pp. 114-122.

PCT/US2008/ 85677 Search Report, Feb. 19, 2009.

Y. Tang et al., "Near-ultraviolet excitable orange-yellow Sr3(Al2O5)Cl2:Eu2+ phosphor for potential application in light-emitting diodes," Applied Physics Letters, vol. 93 , 2008, pp. 1311114-1-1311114-3.

Y. Song et al., "Sr3Al2O5Cl2:Ce3+, Eu2+: A potential turnable yellow-to-white-emitting phosphor for ultraviolet light emitting diodes," Applied Physics Letters, vol. 94, 2009, pp. 091902-1-091902-3.

B. A. Clothier et al.,"Nano-Scale Metal Oxyhalide and Oxysulfide Scintillation Materials and Methods for Making Same," U.S. Appl. No. 11/728,445, filed Mar. 26, 2007.

H. Comanzo et al., "A Method of Producing a Palette of Colors for Persistent Phosphors and Phosphors Made by Same," U.S. Appl. No. 11/654,191, filed Jan. 17, 2007.

* cited by examiner

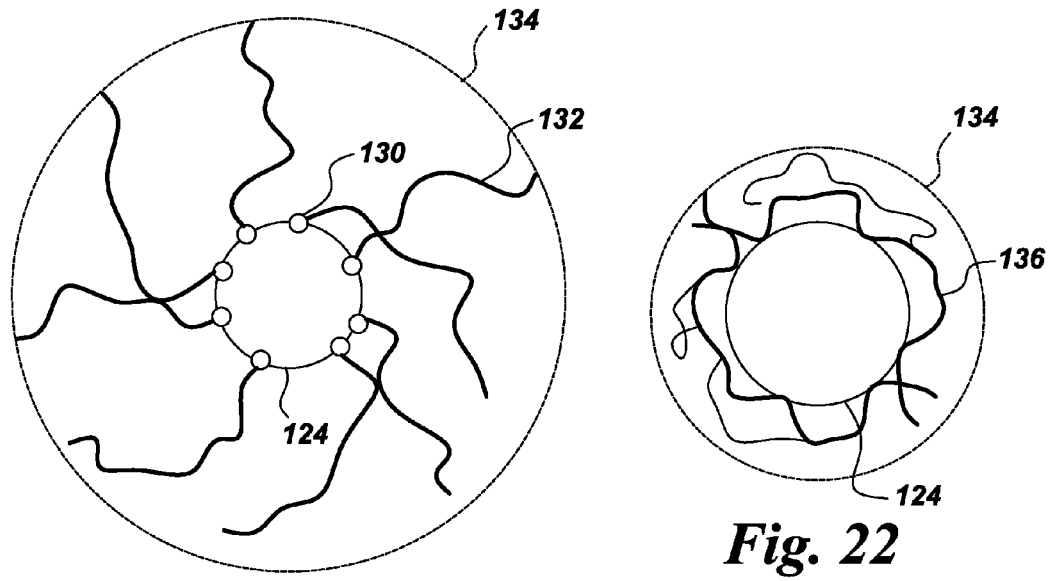
Fig. 21
Fig. 22
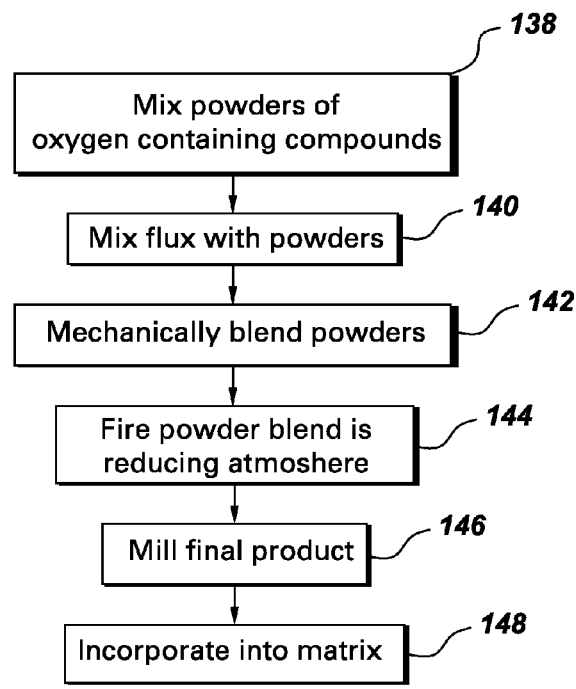
Fig. 23

ARTICLES USING PERSISTENT PHOSPHORS

CROSS-REFERENCE TO RELATED APPLICATIONS

This continuation in part application claims priority to U.S. patent application Ser. No. 11/954,814 U.S. Pat. No. 7,959,827, issued on Jun. 14, 2011 filed Dec. 12, 2007, entitled PERSISTENT PHOSPHOR, the contents of which are hereby incorporated by reference in their entirety.

This continuation in part application claims priority to U.S. patent application Ser. No. 12/606,237 Publication No. US-2011-0095676, published on Oct. 27, 2009 now U.S. Pat. No. 8,211,334 Apr. 28, 2011, entitled ORANGE-RED PERSISTENT PHOSPHORS, the contents of which are hereby incorporated by reference in their entirety.

This continuation in part application claims priority to U.S. patent application Ser. No. 12/057,496 U.S. Pat. No. 8,003,012, filed on Mar. 28, 2008 issued on Aug. 23, 2011, entitled METHOD FOR PRODUCING A PALETTE OF COLORS FOR PERSISTENT PHOSPHORS AND PHOSPHORS MADE BY SAME, the contents of which are hereby incorporated by reference in their entirety. U.S. Pat. No. 8,003,012, in turn, is a continuation in part of U.S. patent application Ser. No. 11/654,191, filed on Jan. 17, 2007, now abandoned.

This continuation in part application claims priority to U.S. patent application Ser. No. 11/654,191 Publication No. US-2008-0171229, published on Jan. 17, 2007, entitled A METHOD OF PRODUCING A PALETTE OF COLORS FOR PERSISTENT PHOSPHORS AND PHOSPHORS MADE BY SAME, now abandoned, the contents of which are hereby incorporated by reference in their entirety.

BACKGROUND OF THE INVENTION

The present invention relates generally to persistent phosphors and more specifically to a variety of persistent phosphors and persistent phosphor blends and articles that use such phosphors and/or phosphor blends.

While persistent phosphors are known, current art suffers from several shortcomings including, for example, poor light duration from the phosphor; lack of high light emission from the phosphor; and/or ineffective phosphors in certain color ranges. As a result, persistent phosphors are not feasible for many applications.

Accordingly, there is an ongoing need for improvements in persistent phosphors.

BRIEF DESCRIPTION

Therefore, in accordance with one aspect of the invention, an article of manufacture comprises: a structure, wherein the structure is one selected from a group consisting of: a security system device, a portion of a security system device, a fire system device and a portion of fire system device; at least one of a persistent phosphor and a persistent phosphor blend, wherein the persistent phosphor and the persistent phosphor blend is one of: integrated in a coating on the structure; applied on the structure; and integrated in the structure, wherein the persistent phosphor comprises at least one of a first phosphor and a second phosphor and the persistent phosphor blend comprises at least one of a first persistent phosphor blend and a second persistent phosphor blend, wherein the first phosphor is at least one of: a phosphor selected from phosphors of formula I and phosphors of formula II; $M^1F_2$-$M^1S:EU^{2+}$, $Ln^{3+}$ (I); $M^2{}_3M^3{}_2O_5X_2:EU^{2+}$, $Ln^{3+}$ (II), wherein $M^1$ is Ba, Sr, Ca, Zn, Mg, or a combination thereof; $M^2$ is Ba, Sr, Ca, Mg, Zn, or a combination thereof; $M^3$ is Al, Ga, B, In, or a combination thereof; X is F, Cl, Br, I, or a combination thereof; and Ln is Dy, Yb, Tm, Er, Ho, Sm, Nd, or a combination thereof; and wherein the second phosphor comprises a general formula of $A_{x-y-z}Al_{2-m-n-o-p}O_4:Eu_y$, $RE_z$, $B_m$, $Zn_n$, $Co_o$, $Sc_p$, wherein: A may be Ba, Sr, Ca, or a combination of these metals; x is between about 0.75 and 1.3; y is between about 0.0005 and 0.1; z is between about 0.0005 and 0.1; m is between about 0.0005 and 0.30; n is between about 0.0005 and 0.10; o is between about 0 and 0.01; p is between about 0 and 0.05; and RE is Dy, Nd, or a combination thereof; and wherein the first persistent phosphor blend comprises: at least one persistent phosphor; and at least one other persistent phosphor, where an excitation spectrum of the at least one other persistent phosphor partially overlaps an emission spectrum of the at least one persistent phosphor; and wherein the second persistent phosphor blend comprises: at least one persistent phosphor comprising a composition selected from the group consisting of: a) a composition having a general formula $A_{x-y-z}Al_{2-m-n-o-p}O_4:Eu_y$, $Dy_z$, $B_m$, $Zn_n$, $Co_o$, $Sc_p$, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula $A_{x-y-z}Al_{2-m-n-o-p}O_4:Eu_y$, $Nd_z$, $B_m$, $Zn_n$, $Co_o$, $Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05; and at least one other phosphor, wherein the excitation spectrum of the at least one other phosphor partially overlaps the emission spectrum of the persistent phosphor.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 21 is a schematic view of a phosphor particle, in accordance with embodiments of the present invention;

FIG. 22 is a schematic view of a phosphor particle coated with a polymer in accordance with embodiments of the present invention;

FIG. 23 is a block diagram of a process to make a phosphor in accordance with embodiments of the present invention;

DETAILED DESCRIPTION

Aspects of the invention relate to the use of novel persistent phosphors (e.g., phosphors and/or phosphor blends) applied, to, on, and/or in articles for fire system and/or security systems. For example, the phosphors may be applied to specific portions or the entire piece of hardware from a fire system and/or security system. The application of the phosphor provides for easier and faster identification and location of fire, safety, and/or security hardware in, for example, low light situations which may be critical in an emergency situation where, for example, power (e.g., lighting) has been lost.

Figure 1:
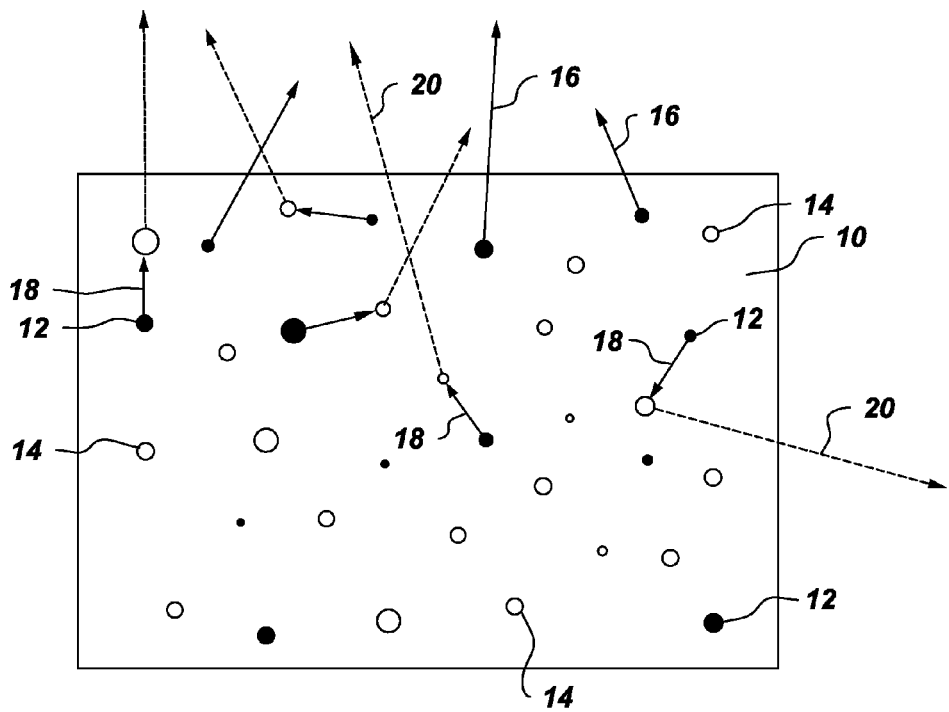
FIG. 1 is a diagrammatical representation of a structure impregnated with particles of two different phosphor materials, a persistent phosphor and another phosphor, in accordance with embodiments of the present invention.

FIG. 1 shows a matrix 10 containing a blend of two types of phosphors: a persistent phosphor 12, and another phosphor 14, in accordance with embodiments of the current invention. In this illustration, the excitation has ended, and the persistent phosphor 12 particles are emitting stored energy as photons. These photons may escape the matrix 10, as indicated generally by reference numeral 16, and be visible as a blue or green luminescence. Alternatively, the emitted photons may be absorbed by particles of another phosphor 14, as represented by reference numeral 18, which then release the captured energy as longer wavelength photons 20. The visible combination of the two types of photons 16, 20 emitted from the matrix 10 results in a different color for the luminescence from the persistent phosphor blend, as compared to the luminescence from the persistent phosphor by itself. For example, if the longer wavelength photons 20 are yellow and the shorter wavelength photons 16 are blue, the overall structure may appear to have a white luminescence. Those skilled in the art will recognize that the phosphor blend is not limited to one persistent phosphor 12 and one other phosphor 14. Indeed, the blend may comprise two or more persistent phosphors in combination with two or more other phosphors, depending on the desired persistence time and emission color. In this embodiment of the current invention, the phosphor powders are blended prior to incorporation into a plastic matrix. In other embodiments, each phosphor may be separately incorporated into the matrix to form a final composition containing a phosphor blend. Those skilled in the art will recognize that the matrix is not limited to plastic, but may also encompass other materials such as paint, glass, or other organic or inorganic matrices, including such materials as transparent ceramics.

The phosphor blend may be made by any suitable mechanical method. In exemplary embodiments, such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders.

Figure 2:
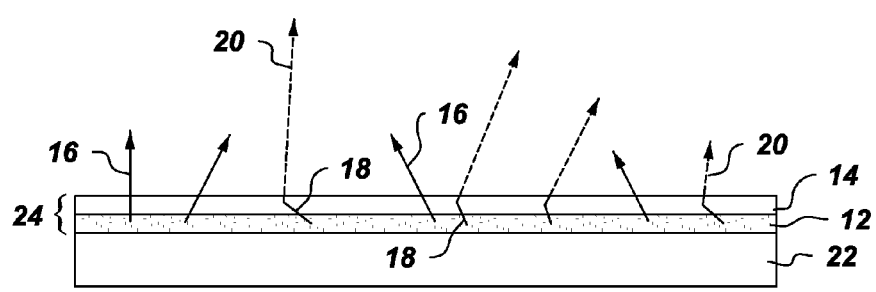
FIG. 2 is a diagrammatical representation of a layered structure containing different phosphors in the different layers, including a persistent phosphor and another phosphor, in accordance with embodiments of the present invention.

FIG. 2 shows an alternate configuration for a multiple phosphor structure, in accordance with embodiments of the current invention. In FIG. 2, a substrate 22 is coated with layers 24 containing a persistent phosphor 12, and another phosphor 14. After the excitation is removed, photons emitted from the persistent phosphor 12 may escape, as indicated by reference numeral 16, and be visible as a blue or green luminescence. Alternatively, the photons emitted from the persistent phosphor 12 may be absorbed by the other phosphor 14, which then emits the absorbed energy as longer wavelength photons 20. As discussed with respect to FIG. 1, if the short wavelength photons 16 are blue and the longer wavelength photons 20 are yellow, the overall structure will appear to have a white luminescence. Furthermore, those skilled in the art will recognize that this structure may have more than one layer containing a persistent phosphor 12, and more then one layer containing another phosphor 14. The ordering of the layers may be controlled to tune the appearance of the emission.

In either of the embodiments discussed with respect to FIGS. 1 and 2, incorporation of the phosphors into a matrix 10 or layers 23 may be implemented using standard processing techniques for the matrix material chosen. For example, in embodiments of the current invention, the phosphors could be incorporated into a paint composition by mixing a powder blend into the base paint mixture, as if the phosphors were a dry pigment. In other embodiments, the phosphors could be stirred into a solvent to form a slurry prior to incorporation in the base paint mixture.

If the matrix is a polymer, incorporation of the phosphors may be done using such techniques as powder blending, compression molding, injection molding, sheet forming, film blowing, fiber forming, or any other plastics processing technique that may incorporate a dry powder blend into a plastic matrix. Those skilled in the art will recognize that the plastic matrix material used in embodiments of the current invention may be any thermoplastic material with sufficient translucency to allow light transfer through thin layers, including, but not limited to, polystyrene, high impact polystyrene (HIPS), styrene-butadiene copolymer, polycarbonate, polyethylene, polyurethane, polyethylene terephthalate (PET), polyethylene terephthalate glycol (PETG), and polypropylene, among others. Furthermore, the plastic matrix may also be a thermo-set material, including, but not limited to, silicone RTV resins, epoxy resins, polyesters, phenol-formaldehyde resins, and melamine, among others. In exemplary embodiments, the phosphors are incorporated into thermo-set resins by mixing the phosphor with one of the two reactant portions.

Figure 3:
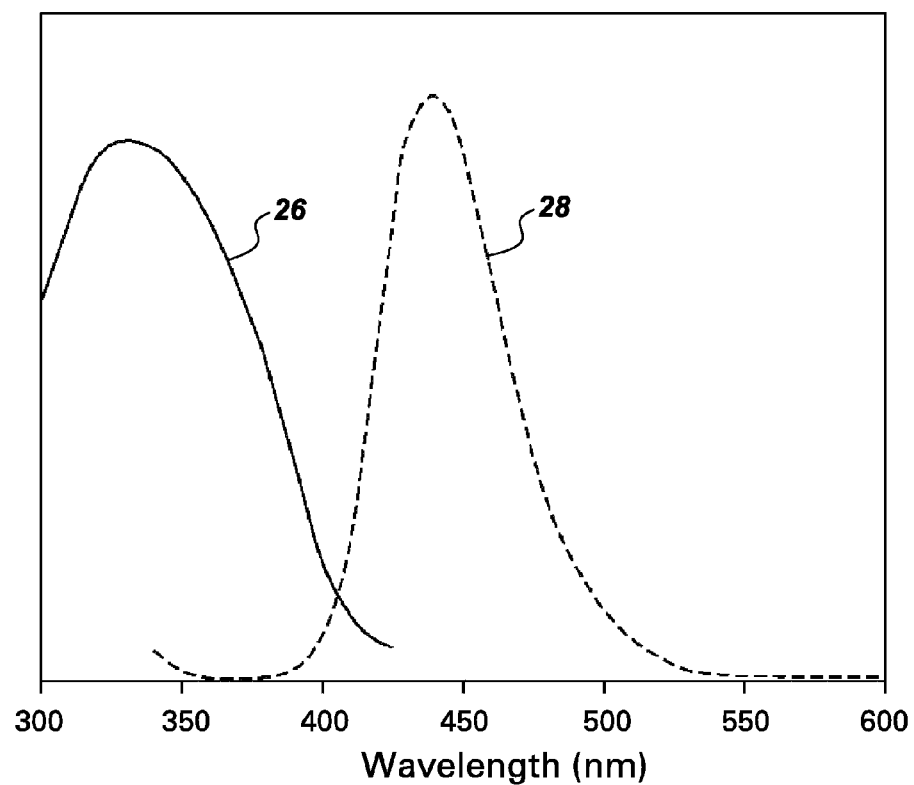
FIG. 3 is a graphical representation of exemplary excitation and emission spectra for a persistent phosphor, which may be used in embodiments of the present invention.

In order for energy to be transferred from the persistent phosphor 12 to the other phosphor 14, the emission spectrum of the persistent phosphor 12 must have some overlap with the excitation spectrum of the other phosphor 14. To illustrate this point, FIGS. 3-7 show the excitation and emission spectra of phosphors that may be used in embodiments of the current invention. For example, FIG. 3 shows the excitation 26 and emission 28 spectra for an exemplary persistent phosphor, $Ca_{0.90}Eu_{0.005}Nd_{0.03}Al_2O_4$, used in embodiments of the current invention. The emission spectrum 28 has a maximum intensity at about 450 nm, with some intensity in the range of about 400 nm to about 550 nm. This emission intensity can be compared to the excitation, or absorbance, spectra for other exemplary phosphors that may be used in embodiments of the current invention, as represented by the solid lines in the spectra shown in FIGS. 4-7.

Figure 4:
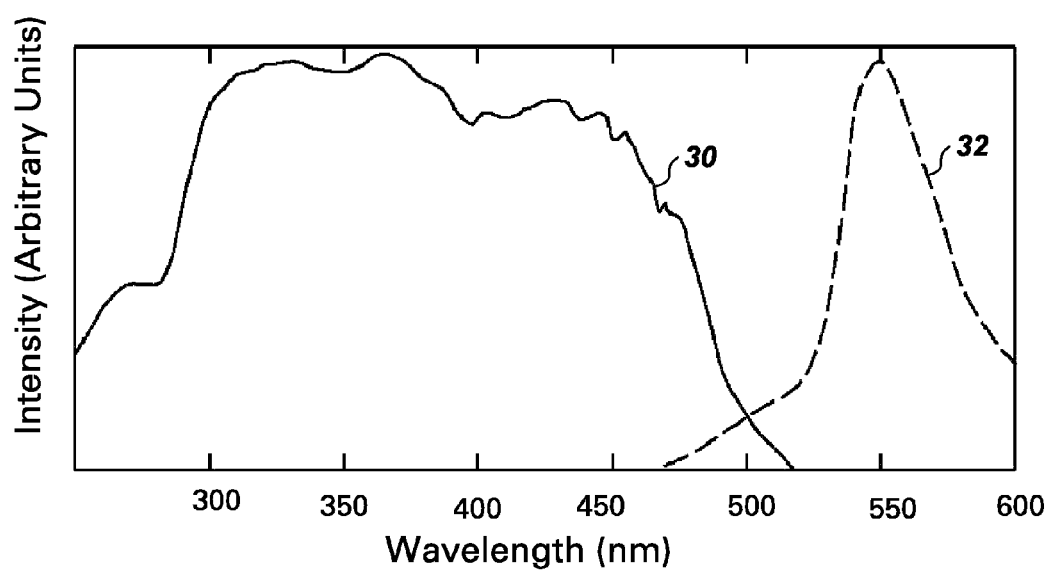
FIG. 4 is a similar graphical representation of exemplary excitation and emission spectra of a phosphor, $(Ca,Sr)_8(Mg,Zn)(SiO_4)_4Cl_2:Eu^{2+}$, $Mn^{2+}$ (CaSi), which may be used in embodiments of the present invention.
Figure 5:
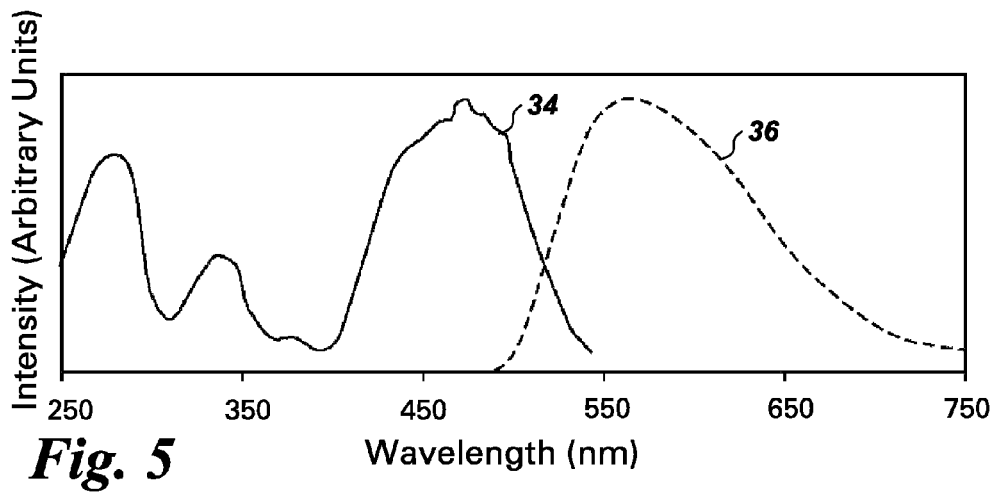
FIG. 5 is a graphical representation of exemplary excitation and emission spectra of another phosphor, $Tb_3M_{4.9}O_{12}:Ce^{3+}$ (TAG:Ce), which may be used in embodiments of the present invention.

FIGS. 4 and 5 show the excitation and emission spectra for phosphors that have a strong absorbance around 450 nm. FIG. 4 shows the excitation and emission spectra, 30 and 32, respectively, of the phosphor $(Ca,Sr)_8(Mg,Zn)(SiO_4)_4O_2$: $Eu^{2+}$, $Mn^{2+}$ (CASI), which may be used in exemplary embodiments of the current invention. FIG. 5 shows the excitation and emission spectra, 34 and 36, respectively, of the phosphor $(Tb,Y,Lu,La,Gd)_3(Al,Ga)_5O_{12}:Ce^{3+}$ (TAG:Ce), which may be used in exemplary embodiments of the current invention. The high degree of overlap between the excitation spectra 30, 34 of these phosphors with the emission spectrum 28 of the exemplary persistent phosphor, discussed with respect to FIG. 3, indicates that efficient energy transfer would occur, and a significant portion of the light emitted may come from the CASI or TAG:Ce in blends with the persistent phosphor.

Figure 6:
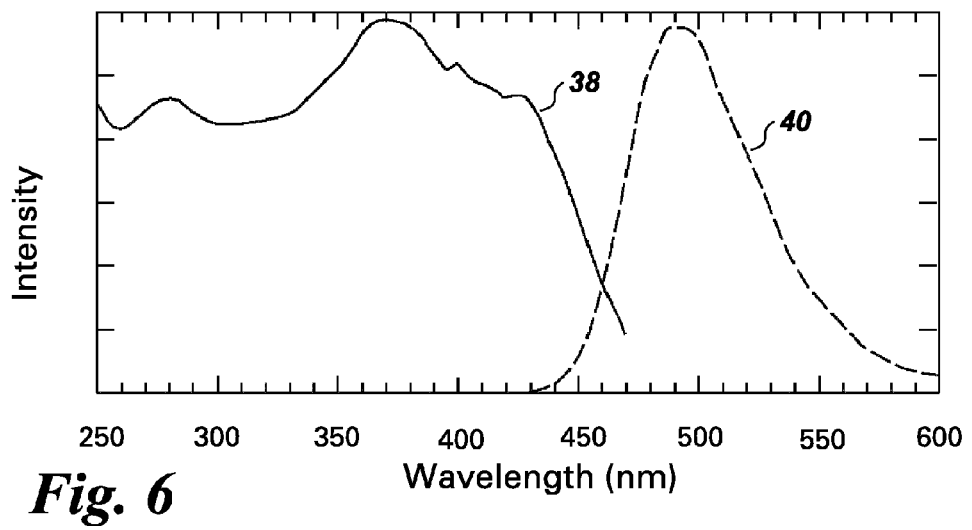
FIG. 6 is a graphical representation of exemplary excitation and emission spectra of another phosphor, $Sr_4Al_{14}O_{25}$:$Eu^{2+}$ (SAE), which may be used in embodiments of the present invention.
Figure 7:
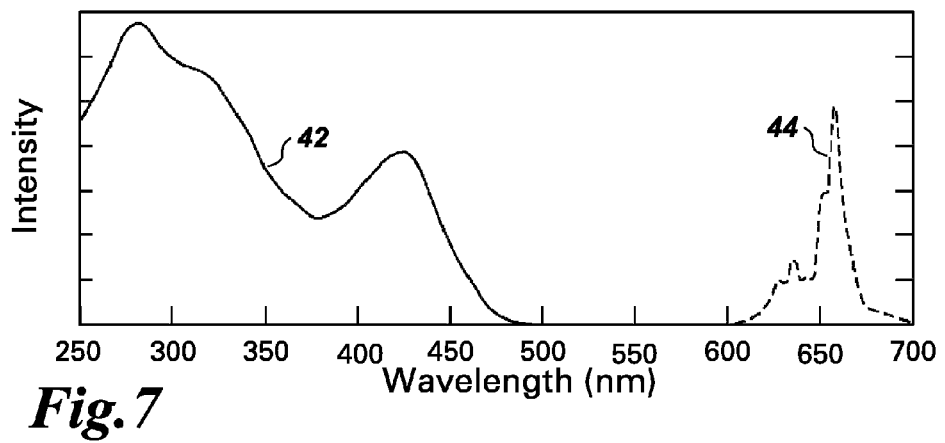
FIG. 7 is a graphical representation of exemplary excitation and emission spectra of another phosphor, $3.5MgO*0.5MgF_2*GeO_2$:$Mn^{4+}$ (MFG), which may be used in embodiments of the present invention.

In contrast to the strong overlap between the spectra described above, FIGS. 6 and 7 show the excitation and emission spectra for phosphors that have a weaker absorbance around 450 nm. FIG. 6 shows the excitation and emission spectra, 38 and 40, respectively, of the phosphor $Sr_4Al_{14}O_{25}:Eu^{2+}$ (SAE), which may be used in exemplary embodiments of the current invention. FIG. 7 shows the excitation and emission spectra, 42 and 44, respectively, of the phosphor $3.5MgO-0.5MgF_2-GeO_2:Mn^{4+}$ (MFG), which may be used in exemplary embodiments of the current invention. The absorbance of these phosphors at 450 nm is lower than that discussed with respect to FIGS. 4 and 5, with most of the absorbance at shorter wavelengths, as shown in the excitation spectra 38, 42. This indicates that the efficiency of the energy transfer from the emission 28 of the exemplary persistent phosphor, discussed with respect to FIG. 3, may be somewhat lower. However, the existence of some overlap between the emission spectrum 28 and the excitation spectra 38, 42 indicates that they may absorb at least a portion of the photons 18 emitted by the persistent phosphor 12 and emit longer wavelength photons 16, changing the perceived color of the blend.

As these examples illustrate, it is not necessary for the emission spectrum of the persistent phosphor to perfectly match the excitation spectrum of the other phosphor. Any energy emitted by the persistent phosphor 12 that is not absorbed by the other phosphor 14 will be emitted from the structure, and become part of the visible light mixture perceived by the viewer.

In embodiments of the current invention, the persistent phosphor may have the general formula $A_{x-y-z}Al_2O_4:Eu_y$, $Nd_z$, where A may be Ba, Sr, Ca, or a combination of these metals, x is between about 0.75 and 1.3, y is between about 0.0005 and 0.1, and z is between about 0.0005 and 0.1. In other embodiments of the current invention, the persistent phosphor may have the general formula $A_{x-y-z}Al_2O_4:Eu_y$, $Dy_z$, where A may be Sr, Ca, Ba, or a combination of these metals, x is between about 0.75 and 1.3, y is between about 0.0005 and 0.1, and z is between about 0.0005 and 0.1. The persistent phosphor compositions shown above are merely examples of phosphors that may be used in embodiments, and are not intended to be limiting. Those skilled in the art will recognize that other persistent phosphor compositions may be used while remaining within the scope of the current invention.

In certain embodiments of the present invention, the persistent phosphor 12 comprises a phosphor as described in U.S. patent application Ser. No. 11/954,814, herein incorporated by reference in its entirety. For example, one phosphor suitable for use in the persistent phosphor 12 has the general formula $A_{x-y-z}Al_{2-m-n-o-p}O_4:Eu_y$, $Dy_z$, $B_m$, $Zn_n$, $Co_o$, $Sc_p$ where A may be Ba, Sr, Ca, or a combination of these elements, x is between about 0.75 and 1.3, y is between about 0.0005 and 0.1, and z is between about 0.0005 and 0.1. Further m is between about 0.0005 and 0.30, n is between about 0.0005 and 0.10, o is between about 0 and 0.01 and p is between about 0 and 0.05. Phosphors made according to this formulation may have a green luminescence and a longer persistence than other types of phosphors. A particular exemplary phosphor of this type has the formula $Sr_{0.9595}Eu_{0.01}Dy_{0.03}Al_{1.885}Sc_{0.01}B_{0.1}Co_{0.005}O_4$.

Alternately, a phosphor suitable for use in the persistent phosphor 12 has the general formula $A_{x-y-z}Al_{2-m-n-o-p}O_4:Eu_y$, $Nd_z$, $B_m$, $Zn_n$, $Co_o$, $Sc_p$ where A may be Ba, Sr, Ca, or a combination of these elements, x is between about 0.75 and 1.3, y is between about 0.0005 and 0.1, and z is between about 0.0005 and 0.1. Further m is between about 0.0005 and 0.30, n is between about 0.0005 and 0.10, o is between about 0 and 0.01, and p is between about 0 and 0.05. Phosphors made according to this formulation may have a blue luminescence and a longer persistence than other types of phosphors. A particular exemplary phosphor of this type has the formula $Ca_{0.932}Eu_{0.005}Nd_{0.03}Al_{1.995}Co_{0.005}O_4$.

For the purposes of describing the compositions above and throughout this description, the term "between" when describing a numerical range shall be interpreted mean a range that is inclusive of the described endpoints.

In embodiments of the current invention, the other phosphor 14 may be a blue emitter, a blue-green emitter, a green emitter, a yellow emitter, a yellow-orange emitter, an orange-red emitter, a red emitter, or a blend of phosphors having these emission colors, depending on the final color and persistence properties desired. In such embodiments, the one or more other phosphors chosen may have the general formulas: $(Ca,Sr)_8(Mg,Zn)(SiO_4)_4Cl_2:Eu^{2+}, Mn^{2+}$ (CASI); $(Tb,Y,Lu,La,Gd)_3(Al,Ga)_5O_{12}:Ce^{3+}$ (TAG:Ce); $Sr_4Al_{14}O_{25}:Eu^{2+}$ (SAE); $3.5MgO\text{-}0.5MgF_2\text{---}GeO_2:Mn^{4+}$ (MFG); $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+}, Mn^{2+}$; $(Ba,Sr,Ca)_5(PO_4)_3(Cl,F,OH):Sb^{3+}$; $LaPO_4:Ce^{3+}, Tb^{3+}$; $CeMgAl_{11}O_{19}:Tb^{3+}$; $GdMgB_5O_{10}:Ce^{3+}, Tb^{3+}, Mn^{2+}$; $GdMgB_5O_{10}:Ce^{3+}, Tb^{3+}$; $(Ba,Sr,Ca)_5(PO_4)_3(Cl,F,OH):Eu^{2+}, Mn^{2+},Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+}, Mn^{2+}$. Those skilled in the art will recognize that the current invention is not limited to the phosphor compositions disclosed above and that other phosphors may be used, while remaining within the scope of the current invention.

The phosphors used in the current invention may be produced by mixing powders of oxygen-containing compounds of the relevant metals, and then firing the mixture under a reducing atmosphere. For example, the persistent phosphor: $Ca_{0.90}Eu_{0.005}Nd_{0.03}Al_2O_4$, used in exemplary embodiments of the current invention, may be produced by mixing powders of oxygen-containing compounds of europium, neodymium, an alkaline-earth metal, and a group 13 metal, and then firing the mixture under a reducing atmosphere. After firing, the phosphor may be ball milled, or otherwise ground, to break up any conglomerates that may have formed during the firing procedure.

In exemplary embodiments, the oxygen-containing compounds may be oxides, carbonates, nitrates, sulfates, phosphates, citrates, carboxylates, and combinations of these compounds. In embodiments containing carboxylates, the carboxylates used may have from one to five carbon atoms, such as formates, ethanoates, proprionates, butyrates, and pentanoates.

In other embodiments, the mixture of starting materials for producing the phosphor also comprises a flux, such as boric acid, lithium tetraborate, lithium carbonate, hydrogen borate, an alkali hydroborate, or a mixture of these compounds. According to another embodiment of the present invention, the flux may be a halide compound, such as a fluoride, of europium, neodymium, the alkaline-earth metals, or the group 13 metals. The halide compound can comprise up to 10 percent, by weight, of the mixture. The flux may also be an alkali halide, such as lithium fluoride, sodium fluoride, or other alkali halides. In embodiments containing a flux, it may be desirable to wash the product with hot water to remove residual soluble impurities originating from the flux.

The oxygen containing compounds may be mixed together by any mechanical method. In exemplary embodiments, such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders. If the mixture is wet, it may be dried first before being fired. The drying may be carried out at ambient atmosphere or under a vacuum.

The mixture of oxide powders is fired in a reducing atmosphere at a temperature in a range from about 900° C. to about 1,700° C. for a time sufficient to convert the mixture to the phosphor. In exemplary embodiments the temperature may be in the range from about 1,000° C. to about 1,400° C. The firing may be conducted in a batch or continuous process, preferably with stirring or mixing to promote good gas-solid contact. The firing time required may range from about one minute to ten hours, depending on the amount of the oxide mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 10° C./minute to about 200° C./minute. In exemplary embodiments, the temperature is raised to the final temperature at rates of about 10° C./minute to about 100° C./minute. Those skilled in the art will recognize that the precise conditions needed for the synthesis of a particular phosphor composition will depend on the phosphor chosen and are within the ambit of the conditions above.

The firing is performed under a reducing atmosphere, which may include such compounds as hydrogen, carbon monoxide, ammonia, hydrazine, or a mixture of these compounds with an inert gas such as nitrogen, helium, argon, krypton, xenon.

In one embodiment, a mixture of hydrogen and nitrogen containing hydrogen in an amount from about 0.5 volume percent to about 10 volume percent may be used as a reducing gas. In another embodiment, the reducing gas may be carbon monoxide, generated in situ in the firing chamber by the reaction between residual oxygen and carbon particles placed in the firing chamber. In yet another embodiment, the reducing atmosphere is generated by the decomposition of ammonia or hydrazine. In exemplary embodiments, after firing, the phosphor may be ball milled in a propanol slurry to break up aggregates that may have formed during firing.

In addition to the synthesis procedures discussed above, many of the phosphors that may be used in embodiments of the current invention may be commercially available. For example, both of the phosphors $Sr_4Al_{14}O_{25}:Eu^{2+}$ (SAE) and $3.5MgO\text{-}0.5MgF_2\text{---}GeO_2:Mn^{4+}$ (MFG), used in embodiments of the current invention, are commercially available.

Figure 8:
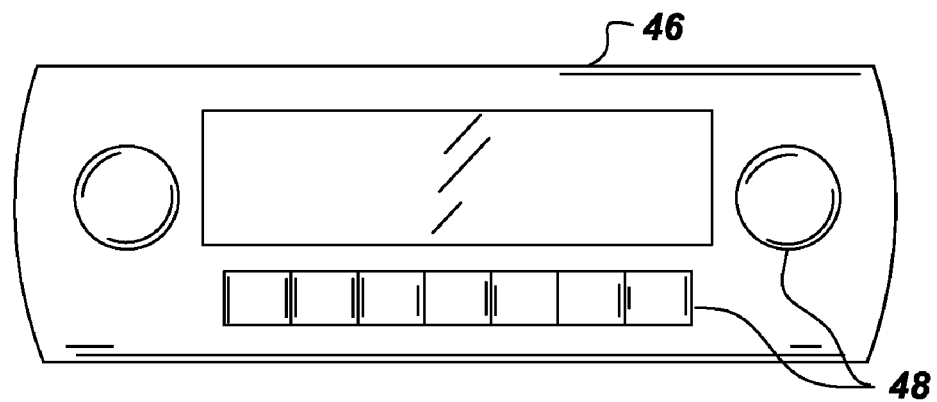
FIG. 8 is an elevational view of an exemplary product that may incorporate aspects of the present invention.
Figure 9:
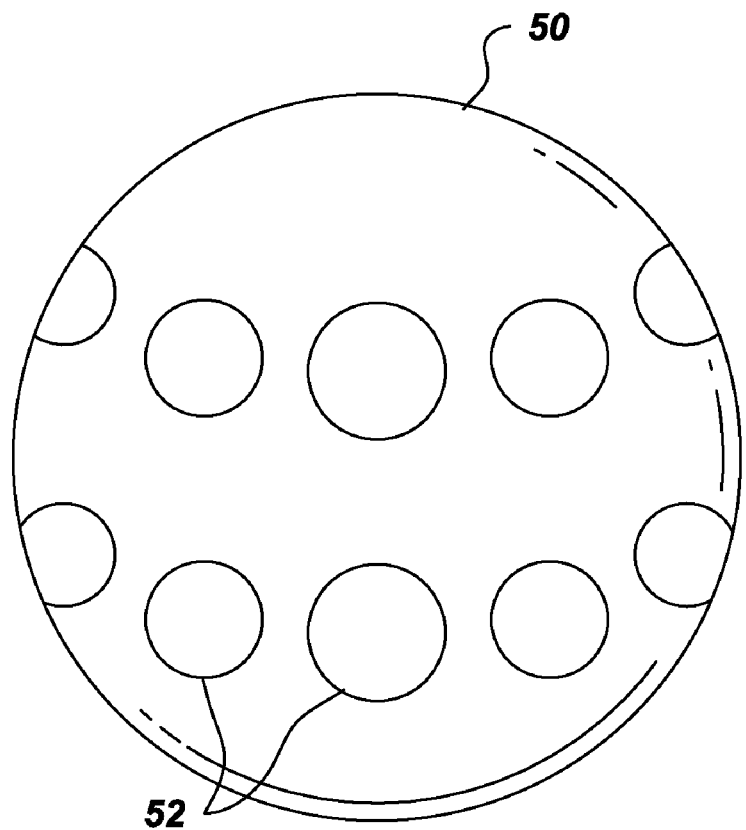
FIG. 9 illustrates another exemplary application that may incorporate aspects of the present invention.

Using the techniques discussed with regard to FIGS. 1 and 2, the phosphor blends of the current invention may be incorporated into numerous products for use in low light applications. For example, FIG. 8 shows the front faceplate 46 of a car radio with controls 48. In embodiments of the current invention, a phosphor blend may either be incorporated in the faceplate 46 or in the controls 48. FIG. 9 shows a child's toy 50 with various decorations 52 attached to the outside. A phosphor blend may be incorporated into the structure of the toy 50 or into the decorations 52, in accordance with embodiments of the current invention.

Figure 10:
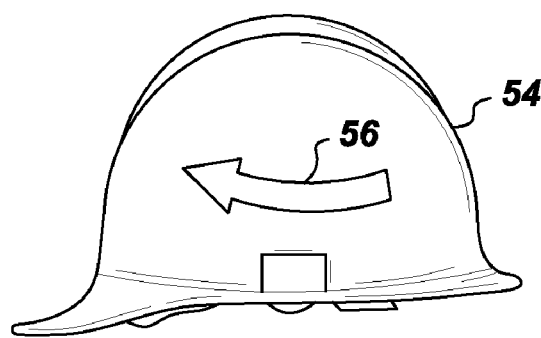
FIG. 10 illustrates a hard hat in accordance with embodiments of the present invention.
Figure 11:
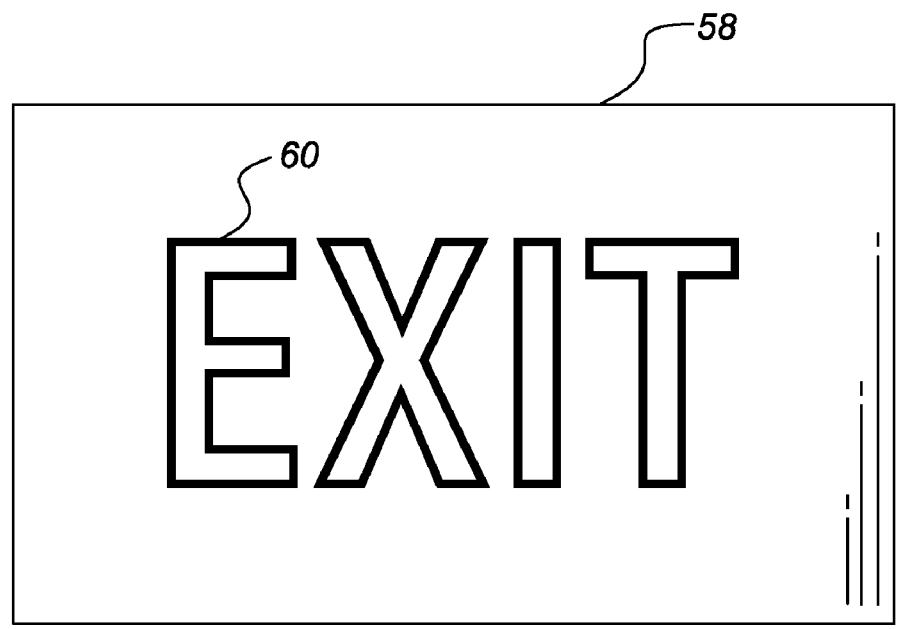
FIG. 11 shows an exit sign in accordance with embodiments of the present invention.
Figure 12:
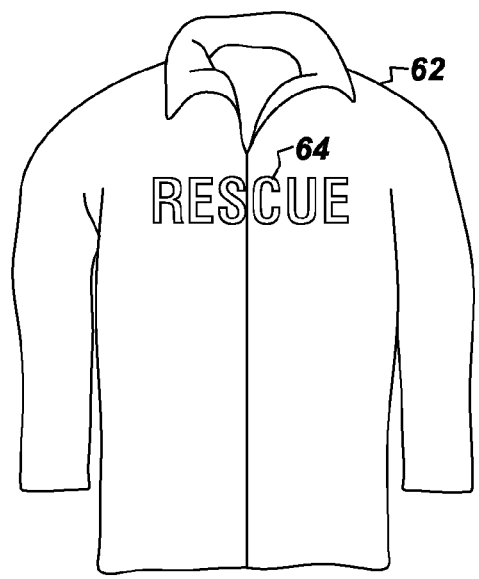
FIG. 12 shows an article of clothing in accordance with embodiments of the present invention.
Figure 13:
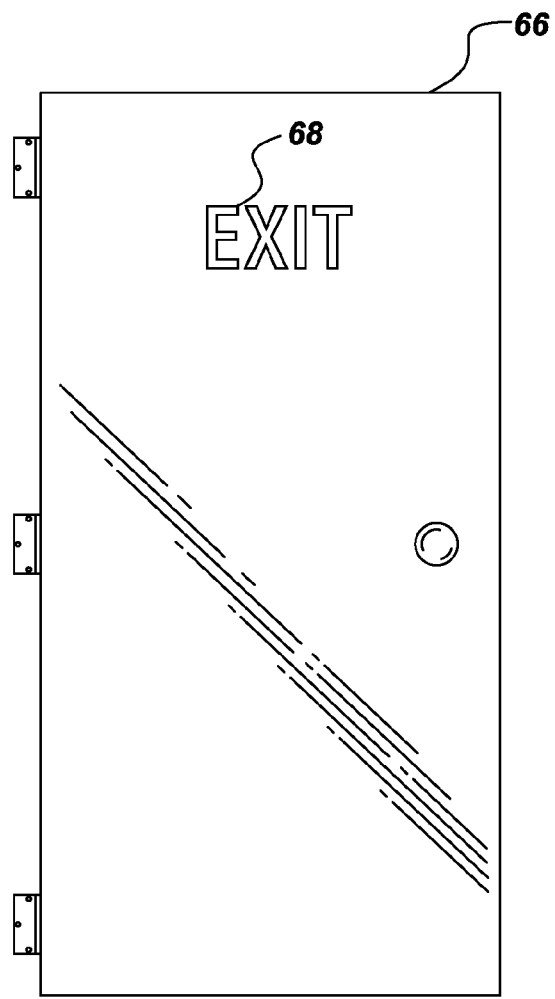
FIG. 13 is a door, with an attached "EXIT" sign in accordance with embodiments of the present invention.

Furthermore, the long persistence and tunable color of the phosphor blends of the current invention make them useful for applications in emergency equipment. For example, FIG. 10 shows a hard hat 54 with stickers 56 attached to the outside. In embodiments of the current invention, a phosphor blend may be incorporated into the body of the hard hat 54 or into the stickers 56. FIG. 11 shows an emergency exit sign 58 with applied lettering 60. In embodiments of the current invention, a phosphor blend may be incorporated into the sign 58 or into the lettering 60. FIG. 12 illustrates an article of clothing 62 with letters 64 attached to the front. A phosphor blend may be incorporated either into the fabric of the article of clothing 62 or into the lettering 64, in accordance with embodiments of the current invention. In FIG. 13, a door 66 has attached letters 68, spelling the word "EXIT" in this example. In embodiments of the current invention, the lettering 68 may incorporate a phosphor blend. The letters may also be colored, so as to be visible at all times, or clear, so as to be visible only in low light conditions, when the glow from the phosphor blend can be seen.

Aspects of the present invention further provide phosphors comprising alkaline earth oxides in combination with a group 13 metal oxide, activated by the addition of combinations of lanthanoid metals, such as europium, dysprosium, and neodymium. For example, phosphors contained in embodiments of the present techniques may have the general formula $A_{x-y-z}Al_{2-m-n-o-p}O_4:Eu_y, Dy_z, B_m, Zn_n, Co_o, Sc_p$ where A may be Ba, Sr, Ca, or a combination of these metals, x is between about 0.75 and 1.3, y is between about 0.0005 and 0.1, and z is between about 0.0005 and 0.1. Further m is between about 0.0005 and 0.30, Zn is between about 0.0005 and 0.10, o is between about 0 and 0.01 and p is between about 0 and 0.05. Phosphors made according to this formulation may have a green luminescence and a longer persistence than other types of phosphors.

Alternately, phosphors made in accordance with present techniques may have the general formula $A_{x-y-z}Al_{2-m-n-o-p}O_4$: $Eu_y, Nd_z, B_m, Zn_n, Co_o, Sc_p$ where A may be Ba, Sr, Ca, or a combination of these metals, x is between about 0.75 and 1.3, y is between about 0.0005 and 0.1, and z is between about 0.0005 and 0.1. Further m is between about 0.0005 and 0.30, Zn is between about 0.0005 and 0.10, o is between about 0 and 0.01, and p is between about 0 and 0.05. Phosphors made according to this formulation may have a blue luminescence and a longer persistence than other types of phosphors.

The phosphors of the present techniques may be made into particles of about 1 to 5 microns, or larger, using standard firing techniques. Alternatively, nano-scale particles may be made using emulsion techniques.

Figure 14:
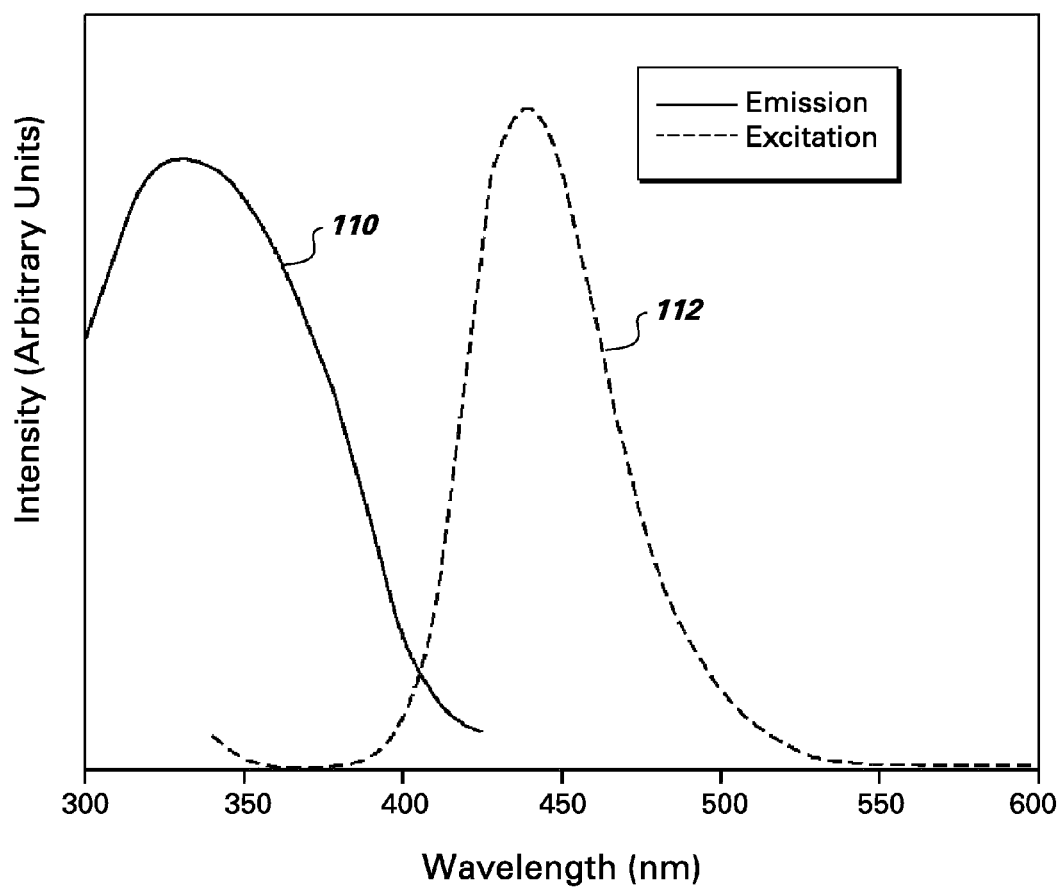
FIG. 14 is a graphical representation of the excitation and emission spectra for a blue persistent phosphor, in accordance with embodiments of the present invention.

The excitation and emission spectra 110, 112 for a blue persistent phosphor in accordance with an embodiment of the present techniques are shown in FIG. 14. In this figure it can be seen that the peak of the excitation spectrum 110 is around 340 nm. This allows light from sources that have intensity in this region, such as sunlight or fluorescent lights, to charge the phosphor with energy. As the phosphor is charged, energy is transferred to the activation sites where it is retained by ions in the excited state for long periods of time prior to those ions losing the energy through the emission of a photon. In a presently contemplated embodiment, the spectrum of the emitted light 112 may peak at about 450 nanometers, which is in the blue region of the spectrum.

Figure 15:
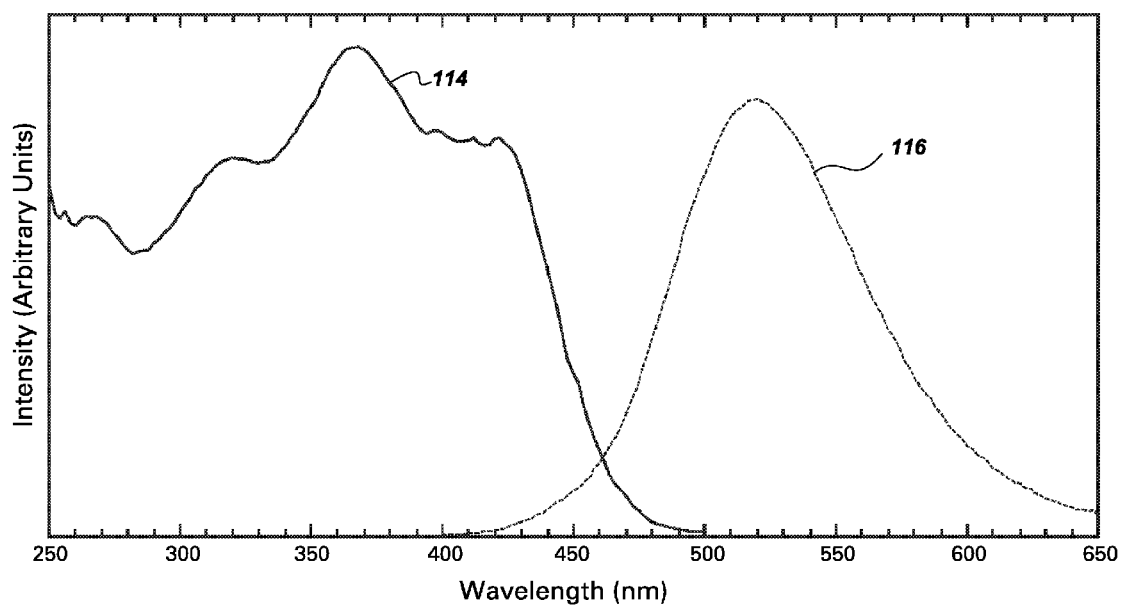
FIG. 15 is a graphical representation of the excitation and emission spectra for a green persistent phosphor, in accordance with embodiments of the present invention.

The excitation 114 and emission 116 spectra for a green persistent phosphor, in accordance with another embodiment, are shown in FIG. 15. In this embodiment, both the absorbance 114 and the emission 116 may be shifted to higher wavelengths in comparison to the excitation 110 and emission 112 for the blue persistent phosphor. For example, the emitted light 116 may peak at about 525 nm, giving the emission a green appearance.

Figure 16:
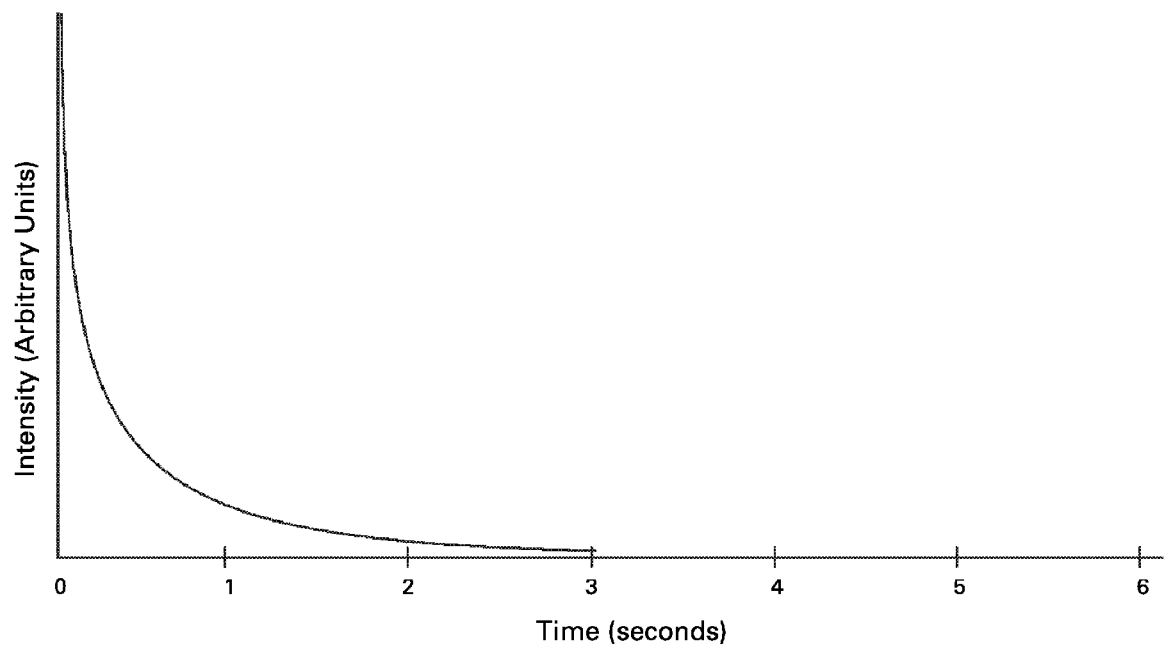
FIG. 16 is a graphical representation of a decay curve representative of a typical short lived phosphor composition.
Figure 17:
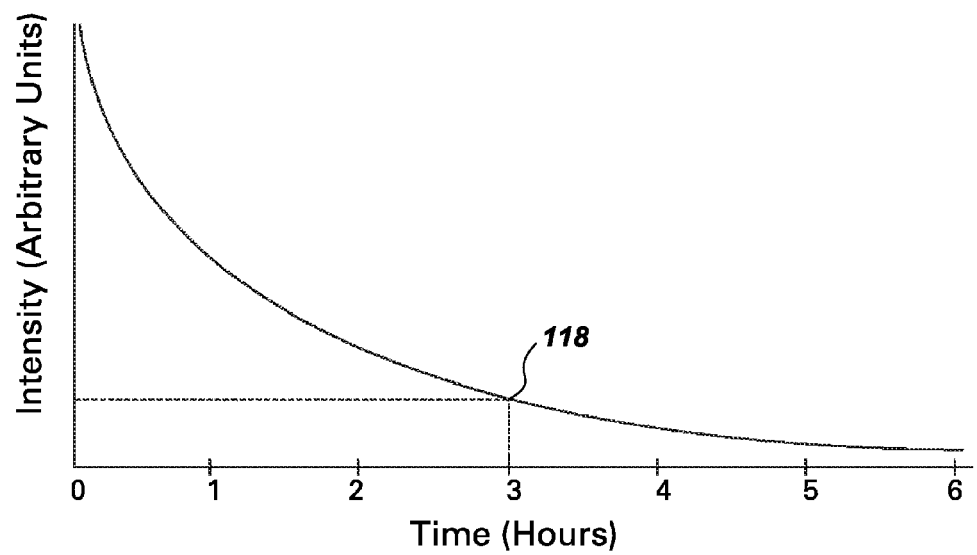
FIG. 17 is a similar graphical representation of a decay curve representative of a typical persistent phosphor composition.

The persistence of phosphors made in accordance with the present techniques may be longer than previous phosphors. For example, FIG. 16 shows a simulated decay curve for a typical phosphor, using a time scale of seconds. A decay curve displays the decay time, e.g., the time required for the phosphor to stop emitting light after the excitation is removed. In this figure, it can be seen that nearly all of the energy of the charged phosphor may be lost within just a few seconds after the excitation is stopped. By comparison, FIG. 17 is a simulated decay curve for a typical persistent phosphor. As can be seen from this figure, the energy retention may be much higher for the persistent phosphor than for the typical phosphor, with a significant amount of emission intensity 118 left after a few hours. This longer decay time may be sufficient for some applications but not for others, since most of the energy may be gone (i.e., the intensity of the emitted light will not be appreciable) within several hours.

Figure 18:
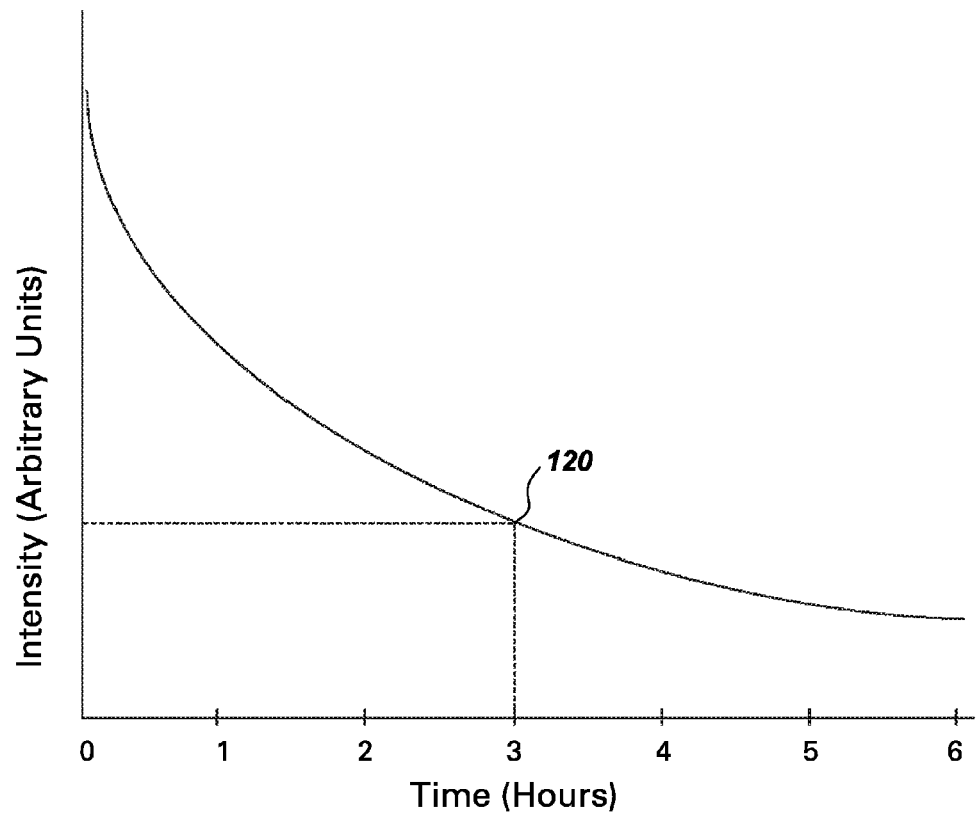
FIG. 18 is a graphical representation of a decay curve representative of a persistent phosphor composition in accordance with embodiments of the present invention.

In contrast to the luminescence decay curves shown in FIGS. 16 and 17, FIG. 18 is a simulated decay curve of a phosphor in accordance with embodiments of the present techniques. As can be seen from this decay curve, much more energy may be retained at the equivalent period of time 120 to that discussed with reference to FIG. 17, with the phosphor persisting for as long as 8 hours or more after the charging illumination has been removed. It should be noted that the scale used for decay is typically logarithmic and, thus, the value of the emission intensity at 8 hours is very weak as compared to the initial intensity. However, the remaining intensity may still be strong enough to still be seen by the human eye in a totally dark environment.

Figure 19:
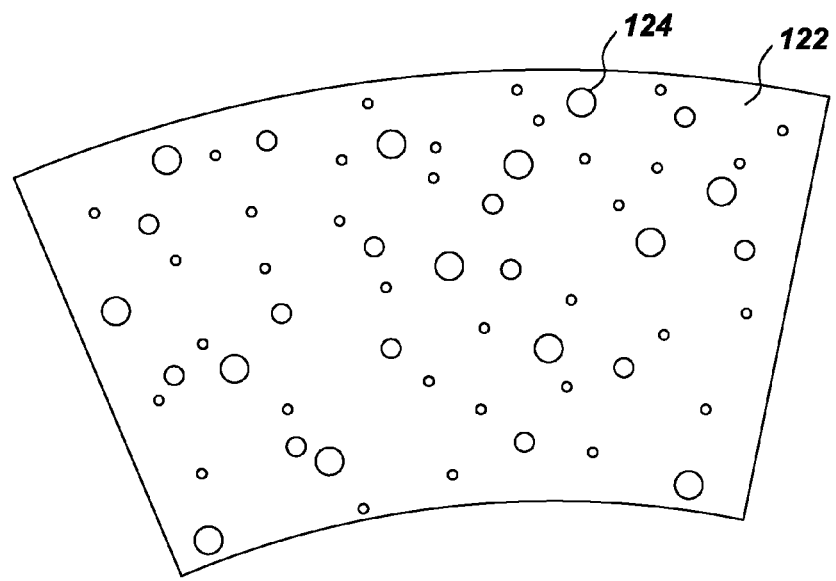
FIG. 19 is a cross-sectional view of an exemplary article of manufacture, in accordance with embodiments of the present invention.
Figure 20:
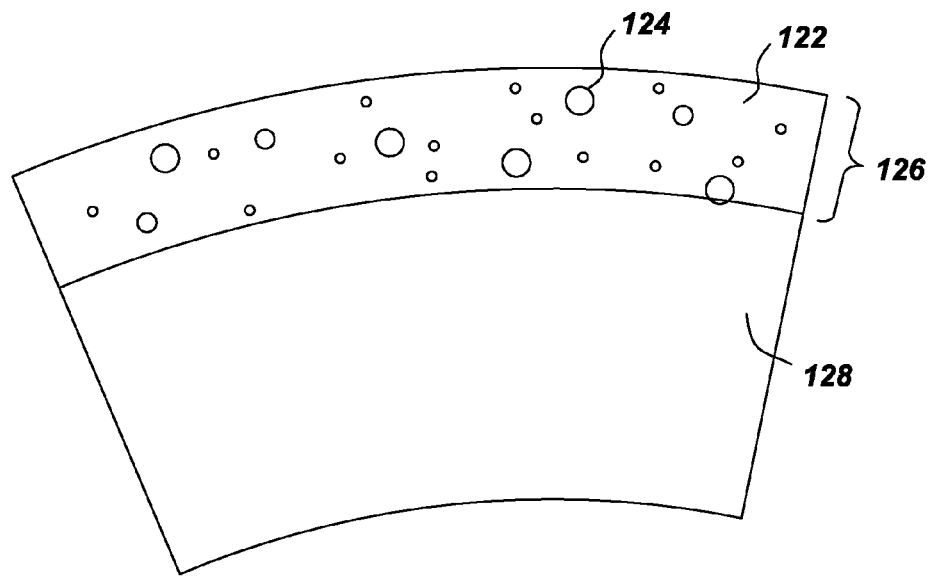
FIG. 20 is cross sectional view of an exemplary article, in accordance with embodiments of the present invention.

The persistent phosphors of the present techniques may be used in any number of applications requiring long term light in locations that have no energy source for powered lighting. In embodiments of the present techniques a plastic matrix 122 may contain embedded particles of a persistent phosphor 124, as shown in FIG. 19. In other embodiments, the phosphor particles 124 may be incorporated into the plastic matrix 122 of a film or surface layer 126 attached to the body 128 of a structure, as shown in FIG. 20. In either of these embodiments, incorporation of the phosphor particles 124 into the matrix 122 or surface layer 126 may be implemented using normal plastics processing techniques. Such techniques could include compression molding, injection molding, sheet forming, film blowing, or any other plastics processing technique that can incorporate a dry powder into a plastic matrix. One skilled in the art will recognize that the plastic matrix material used in these techniques may be any thermoplastic material with sufficient translucency to allow light transfer through thin layers, including, but not limited to, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Furthermore, thermoset materials may also be used for the plastic matrix, including such compounds as silicon room temperature vulcanized (RTV) compounds and epoxies, among others. In embodiments, the phosphors are incorporated into the thermoset resins by mixing the phosphor with one of the two reactant portions. Further, the matrix 122 does not need to be plastic. One of ordinary skill in the art will recognize that the phosphors of the present techniques may be incorporated into glass or ceramic matrices as well.

Particles of the phosphor may lack compatibility with the matrix 122 leading to agglomeration during processing. This effect may be especially severe for smaller particles, such as nano-scale particles, discussed below. For both types of phosphor particles, the effect may be lessened by coating the particles 124 prior to incorporation in the matrix 122. The coating may include either small molecule ligands or polymeric ligands. Exemplary small molecule ligands may include octyl amine, oleic acid, trioctylphosphine oxide, or trialkoxysilane. Those skilled in the art will realize that other small molecule ligands may be used in addition to, or in place of, those listed here. The particles 124 may also be coated with polymeric ligands, which may be either synthesized from the surface of the particles 124 or added to the surface of the nano-scale particles 124.

FIG. 21 illustrates an example of coating a particle 124 by growing polymer chains from the surface of the particle 124. In this diagram, the particle 124 is functionalized by the addition of polymer initiation compounds to form polymer initiation sites 130 on the particle 124. In certain embodiments, such polymer initiation compounds may include amines, carboxylic acids, or alkoxy silanes, among others. Those skilled in the art will recognize that other polymer initiation compounds may work in addition to, or in place of, those listed here. Once the particle 124 has been functionalized with the initiation compounds, monomers may be added to the solution to grow polymeric or oligomeric chains 132 from the initiation sites 130. The final size of the shell 134 that is formed around the particle 124 will depend on the number of initiation sites 130 and the amount of monomer added to the solution. Those skilled in the art will recognize that these parameters may be adjusted for the results desired.

FIG. 22 illustrates an example of coating a particle 124 with a polymer 136. In this case, the polymer chain may be chosen to interact with the particle, and may include random copolymers and block copolymers. In the later case, one monomer chain may be chosen to interact with the particle 124, while the other may be chosen to interact with the matrix 122. In certain embodiments, the polymer coating may include such groups as amines, carboxylic acids, and alkoxy silanes, among others. One of ordinary skill in the art will recognize that other functional groups may also be effective.

The persistent phosphors of the current techniques may be produced in various manners, such as by fixing mixtures of precursor powders under a reducing atmosphere. Alternatively, the persistent phosphors may be produced as nano-scale particles, using an emulsion to control the particle size.

In embodiments, the persistent phosphors may be produced by mixing powders of oxygen-containing compounds of europium, neodymium or dysprosium, an alkaline-earth metal, one or more group 13 elements, and other metal oxygen-containing compounds, in accordance with the formulations shown above, and then firing the mixture under a reducing atmosphere as shown in Block 138 of FIG. 23. The oxygen-containing compounds may be oxides, carbonates, nitrates, sulfates, phosphates, citrates, carboxylates, and combinations of these compounds. In embodiments containing carboxylates, the carboxylates used may have from one to five carbon atoms, such as formates, ethanoates, proprionates, butyrates, and pentanoates.

In other embodiments, the mixture of starting materials for producing the phosphor may also include a flux, as shown in block 140. The flux may include materials such as, for example, boric acid, lithium tetraborate, lithium carbonate, hydrogen borate, an alkali hydroborate, or a mixture of these compounds.

The oxygen containing compounds may be mixed together, as shown in block 142, by any appropriate mechanical method. In embodiments, such methods may include stirring or blending the powders in a high speed blender, ball mill or a ribbon blender. Those skilled in the art will recognize that any number of other techniques may be used to make a well blended mixture of powders. If the mixture is wet, it may be dried first before being fired. The drying may be carried out at ambient atmosphere or under a vacuum.

The mixture of oxide powders may be fired in a reducing atmosphere, as shown in block 144, at a temperature in a range from about 900° C. to about 1,700° C. for a time sufficient to convert the mixture to the phosphor. In embodiments the temperature may be in the range from about 1,000° C. to about 1,400° C. The firing may be conducted in a batch or continuous process, preferably with stirring or mixing to promote good gas-solid contact. The firing time required may range from about one minute to ten hours, depending on the amount of the oxide mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 10° C./minute to about 200° C./minute. In embodiments, the temperature is raised to the final temperature at rates of about 10° C./minute to about 100° C./minute.

The firing is performed under a reducing atmosphere, which may include such compounds as hydrogen, carbon monoxide, ammonia, or a mixture of these compounds with an inert gas such as nitrogen, helium, argon, krypton, xenon. In an embodiment, a mixture of hydrogen and nitrogen containing hydrogen in an amount from about 0.5 volume percent to about 10 volume percent may be used as a reducing gas. In another embodiment, the reducing gas may be carbon monoxide, generated in situ in the firing chamber by the reaction between residual oxygen and carbon particles placed in the firing chamber. In yet another embodiment, the reducing atmosphere is generated by the decomposition of ammonia or hydrazine.

The fired phosphor may be milled to form smaller particles and break up aggregates, as shown in block 146. The final phosphor may then be incorporated into the matrix to form the final product, as shown in block 148. If still smaller particles 124 are needed, micro-emulsions may be used to generate nano-scale particles. Such nano-scale phosphor particles may be from about 900 nm to 100 nm in size, or even smaller.

In a micro-emulsion, finely dispersed droplets of a solvent are suspended in another immiscible solvent, such as water in oil. The droplets are stabilized by the addition of an amphiphilic molecule, such as a surfactant, which lowers the interfacial energy between the two incompatible solvents. The amount of the amphiphilic molecule may control the size of the droplets, and, thus, the size of the resulting particles. In a water-in-oil configuration, the water droplets are typically sized in the nanometer range, and may be used as reactors to form the final particles.

Figure 24:
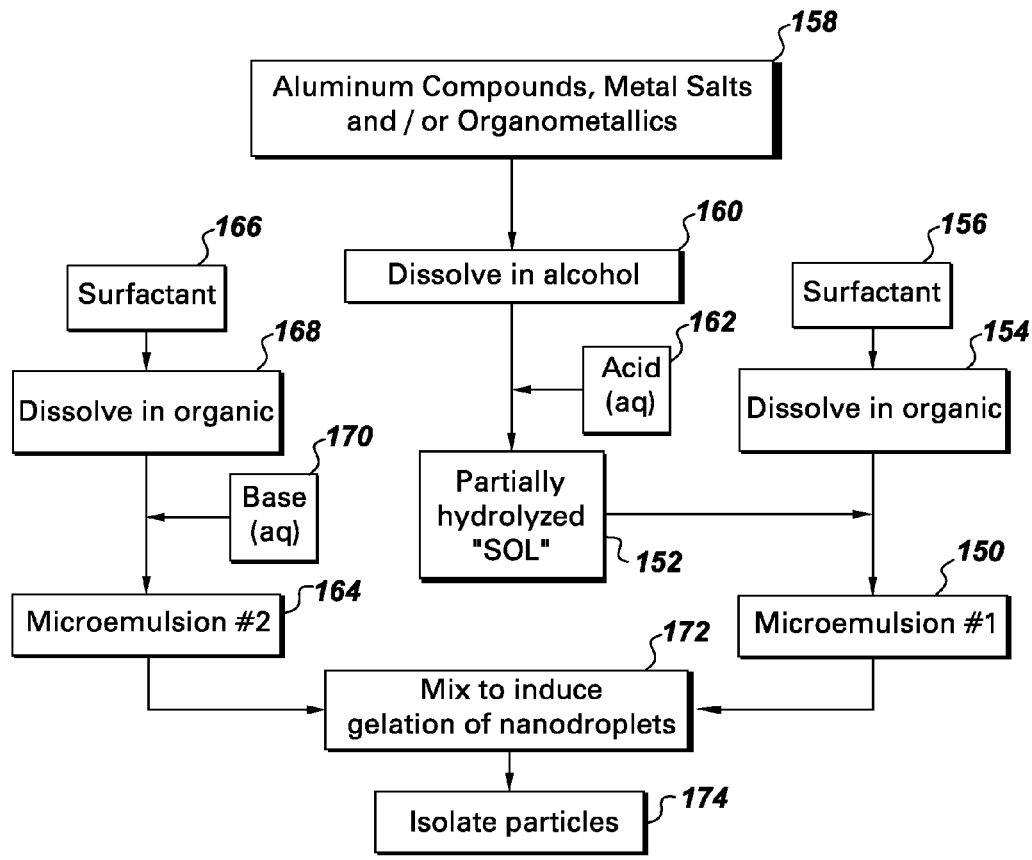
FIG. 24 is a block diagram of a process to make oxide based nano-scale phosphor particles in accordance with embodiments of the present invention.

FIG. 24 is a block diagram of a sol-gel based micro-emulsion process for the formation of nano-scale particles 124 of a metal oxide phosphor. In this procedure, a first micro-emulsion 150 is formed by combining an aqueous sol solution 152 with a solution formed by dissolving a surfactant 156 in an organic or aqueous solvent, as shown in block 154. Generally, the solvent may be an organic.

In this procedure, the aqueous sol solution 152 is formed by first dissolving one or more aluminum compounds, metal salts, and/or organometallics 158 in an alcohol, as shown in block 160. An aqueous acid solution 162 is then added to the alcohol solution to partially hydrolyze the aluminum compounds, leading to the formation of the sol solution 152. In embodiments which have an aluminum oxide matrix, aluminum containing compounds may be used, including, for example, triethylaluminum or metal (tetraethyl aluminum), wherein the metal comprises at least one metal anion selected from the group consisting of lanthanoids, group 1 metals, group 2 metals, group 3 metals, group 6 metals, group 12 metals, group 13 metals, group 14 metals, and group 15 metals.

The metal salts chosen depend on the final metal oxide desired. In an embodiment, the metal salts are $Eu(NO_3)_2$, $Nd(NO_3)_3$, $Zn(NO_3)_2$, and $Co(NO_3)_3$. One of ordinary skill in the art will recognize that each independent phosphor will require the choice of appropriate precursor salts.

The second component of the first micro-emulsion 150 is formed by dissolving a surfactant 56 in a solution 154, which generally may be an organic. In an embodiment, the surfactant is polyoxyethylene (5) nonylphenylether, available as Igepal® CO-520 from ICI Americas. Those skilled in the art will recognize that any number of surfactants may be employed, including such surfactants as aromatic ethoxylates; polyethylene glycol dodecyl ethers, available as Brij® from ICI Americas; sorbitan-fatty acid ester surfactants, available as Tween® from ICI Americas; polyoxyethylene-sorbitan fatty acid ester surfactants, available as Span® from ICI Americas; or alkylphenols, among others. In an embodiment, the organic solvent is n-hexane. Those skilled in the art will recognize that any number of other organic solvents, including alkyl or aryl solvents, may be used.

The second micro-emulsion 164 is formed by dissolving a surfactant 166 in a solvent, as shown in block 168. The solvent may generally be an organic. A solution of an aqueous base 170 is added to the solution formed in block 168 to form the second microemulsion 164. In an exemplary implementation, the surfactant may be polyoxyethylene (5) nonylphenylether, available as Igepal® CO-520 from ICI Americas. As discussed above, however, any number of other surfactants may be employed while remaining within the scope of the present disclosure. In an exemplary implementation, n-hexane is used as the solvent. Those skilled in the art will recognize that any number of other organic solvents, including alkyl or aryl solvents, may be used. In certain embodiments of the present technique, the aqueous base is ammonium hydroxide. Those skilled in the art will realize that other aqueous base solutions may be employed while remaining within the scope of the present disclosure.

The first micro-emulsion 150 and the second micro-emulsion 164 are combined, as shown in block 172, to form another micro-emulsion containing nano-scale droplets of a sol-gel containing a metal oxide precursor for the phosphor. The particles of the sol-gel material may be isolated from the combined micro-emulsion, as shown in block 174. In an exemplary implementation, this isolation may be performed by freeze-drying. Those skilled in the art will recognize that other techniques may also be employed to isolate the particles, including pressure filtration and centrifugation, among others. After isolation, the particles may be fired to form the final nano-scale particles of the metal oxide phosphor. This firing is typically performed under a controlled atmosphere at 900-1400° C., for a period of 1 minute to ten hours. Those skilled in the art will recognize that the precise conditions required for firing will depend on the particle size and materials chosen.

Figure 25:
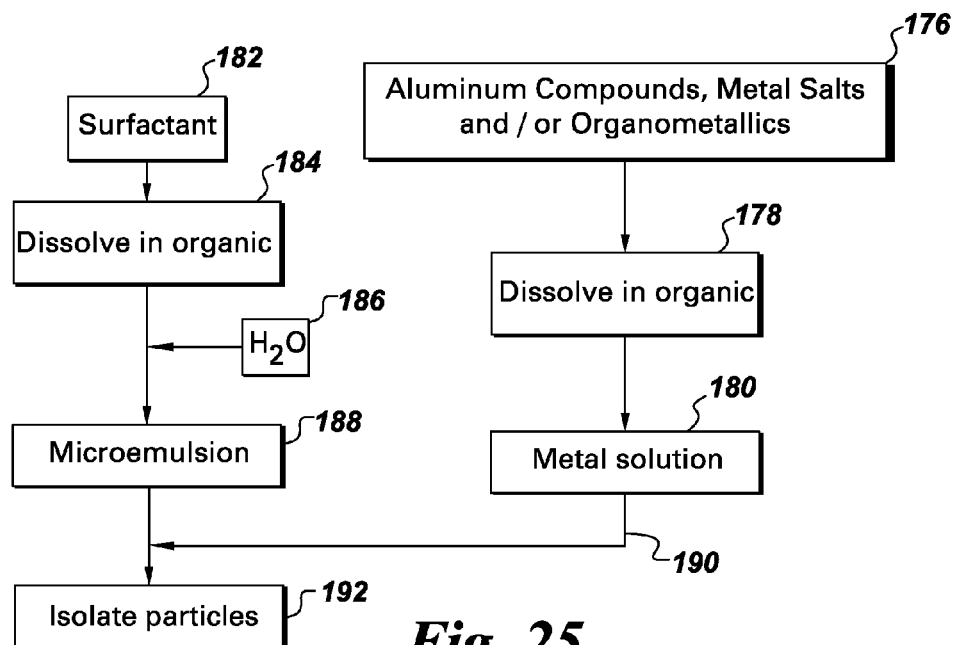
FIG. 25 is a block diagram of another process to make oxide based nano-scale phosphor particles in accordance with embodiments of the present invention.

FIG. 25 is a block diagram of another procedure for the formation of a metal oxide based phosphor, in accordance with certain embodiments. In this procedure, one or more aluminum compounds and one or more organic metal salts 176 are dissolved in an organic solvent, as shown in block 178, to form a metal solution 180. In embodiments, the aluminum compounds may be triethyl aluminum, or metal (tetraethylaluminum), as discussed with respect to FIG. 24, above. The metal salts chosen depend on the final metal oxide desired. In an embodiment, the organic metal salts include hexanoate or carboxylate salts of europium, neodymium, dysprogium, zinc, cobalt, and/or a boron compound. Those skilled in the art will recognize that other metal oxide phosphors, such as those discussed above, may be made using this process, requiring different metal salts be chosen.

A surfactant 182 is then dissolved in an organic solvent, as shown in block 184. Water 186 is added to this solution to form a micro-emulsion 188. In an embodiment, the surfactant is polyoxyethylene (5) nonylphenylether, available as Igepal® CO-520 from ICI Americas. Those skilled in the art will recognize that any number of surfactants may be employed, including such surfactants as aromatic ethoxylates; polyethylene glycol dodecyl ethers, available as Brij® from ICI Americas; sorbitan-fatty acid ester surfactants, available as Tween® from ICI Americas; polyoxyethylene-sorbitan fatty acid ester surfactant, available as Span® from ICI Americas; or alkylphenols, among others. In an embodiment, the organic solvent is n-hexane. Those skilled in the art will recognize that any number of other organic solvents, including alkyl or aryl solvents, may be used.

The metal solution 180 may be heated and slowly added to the micro-emulsion 188, as indicated by reference numeral 190, to form sol-gel particles containing the metal oxide precursors. As shown in block 192, these particles may be isolated from the micro-emulsion, such as by freeze-drying. Those skilled in the art will recognize that other techniques may also be employed to isolate the particles, including pressure filtration and centrifugation, among others. After isolation, the particles may be fired to form the final nano-scale particles of the metal oxide phosphor. This firing is typically performed under a controlled atmosphere at 900-1400° C., for a period of 1 minute to ten hours. Those skilled in the art will recognize that the precise conditions required for firing will depend on the particle size and materials chosen.

The phosphor particles 124 of the present techniques may be incorporated into numerous products used in low light applications. For example, FIG. 8 shows the front faceplate 46 of a car radio. In embodiments the phosphors could either be incorporated in the faceplate 46, or in the controls 48 attached to the faceplate 46.

Additionally, the low toxicity of the phosphors of the present techniques makes applications such as toys and other commercial or consumer goods a possibility. FIG. 9 shows a child's toy 50 with various decorations 52 attached to the outside. In embodiments, the persistent phosphors may be incorporated into the structure of the toy 50, or into the decorations 52 applied to the outside.

Furthermore, the long persistence of the phosphors of the present techniques makes them useful for applications in emergency equipment. FIG. 10 shows a hard hat 54. In embodiments, the phosphors may be incorporated into the body of the hard hat 54 or into stickers or decals 56 applied to the side of the hard hat 54. FIG. 11 shows an emergency exit sign 58. In embodiments the persistent phosphors may by incorporated into the sign 58 or into the lettering 60 on the sign 58. FIG. 12 illustrates an article of clothing 62 with lettering 64. In embodiments the persistent phosphor could be incorporated either into the fabric of the article of clothing 62 or into the lettering 64. In FIG. 13 a door 66 has attached letters 68, spelling the word "EXIT" in this example. In embodiments the lettering 68 could either be colored, so as to be visible at all times, or clear, so as to be visible only in low light conditions, when the glow from the incorporated phosphors may be visible.

Persistence time is the time, after discontinuing irradiation, that it takes for phosphorescence of a sample to decrease to the threshold of eye sensitivity. This threshold is the signal level of emission intensity that a naked (i.e., unaided) eye can clearly see in the dark. Persistence times are assessed by measuring phosphorescence intensity as a function of time.

As used herein, "long persistent phosphor" refers to materials having persistence times exceeding 2 hours. The persistence time of phosphors of formula I and II may exceed two or more hours. It is generally the case that phosphors having longer persistence times are more preferred. Phosphors of formula I and II may exhibit phosphorescence persistence times of greater than about two hours.

In certain embodiments, the phosphors of formula II are $Sr_3M^{3+}{}_2O_5X_2{:}Eu^{2+}, Dy^{3+}$ or $M^2{}_3Al^3{}_2O_5X_2{:}Eu^{2+}, Dy^{3+}$, and more particularly, $Sr_3Al_2O_5Cl_2{:}Eu^{2+}, Dy^{3+}$. One embodiment of the phosphors of formula I is $SrF_2—SrS{:}Eu^{2+}, Dy^{3+}$.

Figure 26:
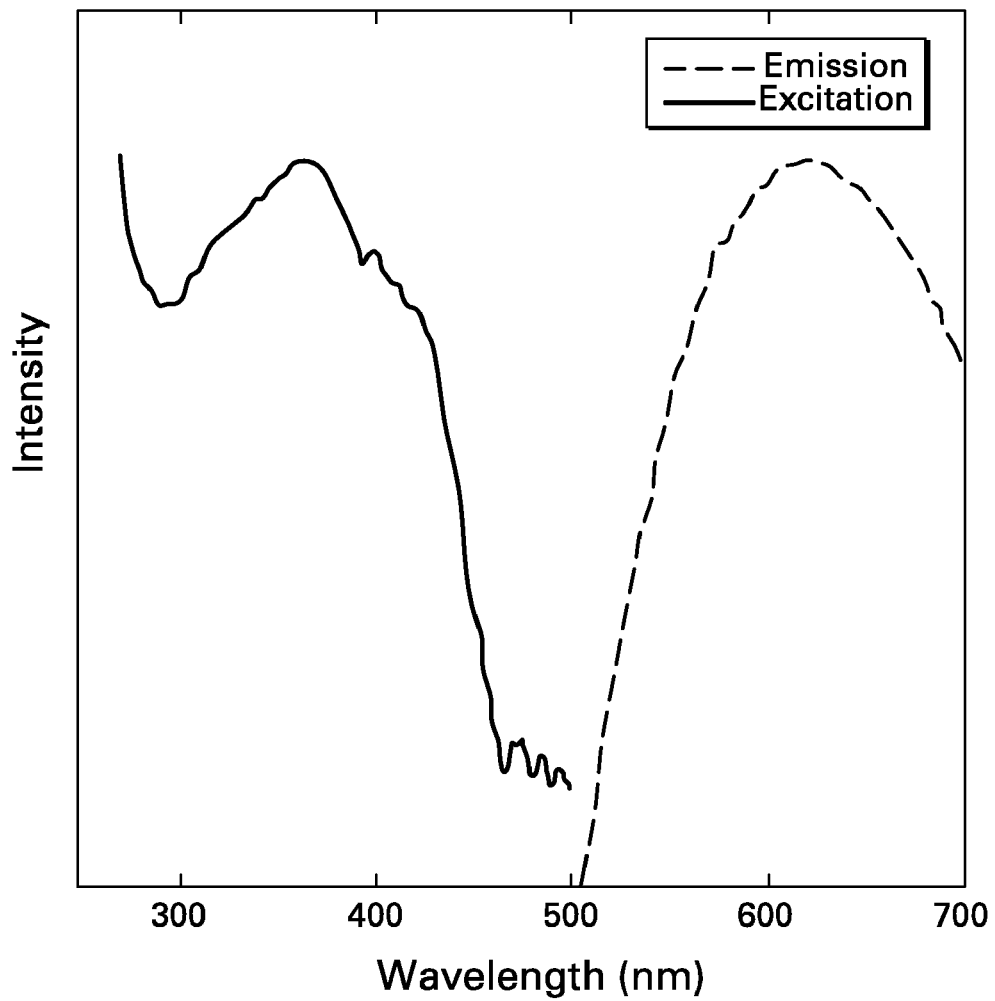
FIG. 26 is a graph showing excitation and emission spectra for an orange-red phosphor in accordance with embodiments of the present invention.

FIG. 26 shows emission and excitation spectra of an orange phosphor of formula II, $Sr_3Al_2O_5Cl_2{:}Eu^{2+}, Dy^{3+}$. The peak of the excitation curve is at about 340 nm, and light from sources that have emission in this region, such as sunlight or fluorescent lights, may charge the phosphor. As the phosphor is charged, energy is transferred to the activation sites where it is retained by ions in the excited state for long periods of time prior to those ions losing the energy through the emission of a photon. The peak of the emission curve is at about 630 nanometers, which is in the orange region of the spectrum. Phosphors of formula I and II may be red, orange, yellow, or somewhere in between, or may be of other colors.

Phosphors of formula I and II may be produced using known solid state reaction processes for the production of phosphors by combining, for example, elemental halides, elemental oxides, carbonates and/or hydroxides as starting materials. Other starting materials may include nitrates, sulfates, acetates, citrates, or oxalates. Alternately, coprecipitates of the rare earth oxides may be used as the starting materials for the rare earth elements.

In a typical process, the starting materials are combined via a dry blending process and fired in air or under a reducing atmosphere at from, e.g., 1000 to 1600° C. A fluxing agent may be added to the mixture before or during the step of mixing. This fluxing agent may be $AlF_3$, $NH_4Cl$ or any other conventional fluxing agent, such as a fluorides or chlorides of aluminum, gallium, indium, calcium or magnesium, or a mixture thereof. A quantity of a fluxing agent of less than about 20, preferably less than about 10, percent by weight of the total weight of the mixture is adequate for fluxing purposes.

The starting materials may be mixed together by any mechanical method including, but not limited to, stirring or blending in a high-speed blender or a ribbon blender. The starting materials may be combined and pulverized together in a bowl mill, a hammer mill, or a jet mill.

The firing may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a firing time up to about 10 hours is adequate. The reducing atmosphere typically comprises a reducing gas such as hydrogen, carbon monoxide, or a combination thereof, optionally diluted with an inert gas, such as nitrogen or helium, or a combination thereof. Alternatively, the crucible containing the mixture may be packed in a second closed crucible containing high-purity carbon particles and fired in air so that the carbon particles react with the oxygen present in air, thereby, generating carbon monoxide for providing a reducing atmosphere.

The phosphors of formula I and II may contain optically inert trace impurities including, for example, strontium silicates and strontium aluminum silicates. The presence of such impurities in an amount up to 10% by weight of the phosphor composition will not significantly affect the quantum efficiency or color of the phosphor.

While suitable in many applications alone, the phosphors of formula I and II may be blended with each other, and one or more additional phosphors for use in any applications. Thus, in another aspect, the present invention relates to a blend of a phosphor of formula I or II with one or more additional phosphors. When used in combination phosphors of other colors, the color of the light emitted by the blend may be tuned as desired by adjusting the relative amounts of the phosphors of different colors.

In general, the phosphors of formula I and II have a variety of applications for the manufacture of luminous materials such as paints, inks, plastics, resins, ceramics and glasses. These materials may be used in novelty articles such as toys, jewelry, ornaments, writing implements, and apparel. The phosphors may be also used in any application requiring long term light emission in locations that have no energy source for powered lighting, particularly for lighting and signage in security, safety, and emergency egress applications.

The phosphors of formula I and II may be used in the manufacture of phosphorescent articles which incorporate the phosphors into a suitable matrix. The phosphorescence of the phosphor of formula I and II is typically not affected when the phosphor is dispersed in a matrix which does not substantially react with the phosphor (e.g. enamels, waxes, varnishes, paints, and polymers). Material for use in such a matrix include thermoplastic and thermosetting materials with sufficient translucency to allow light transfer through thin layers. Exemplary thermoplastic materials include, but are not limited to, vinyl, PVC, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Exemplary thermoset materials include such compounds as silicon room temperature vulcanized (RTV) compounds and epoxies, among others. In embodiments, the phosphors are incorporated into the thermoset resins by mixing the phosphor with one of the two reactant portions. Further, the matrix does not need to be plastic. One of ordinary skill in the art will recognize that the phosphors of formula I and II may be incorporated into glass or ceramic matrices as well.

The phosphors of formula I and II may be incorporated into numerous products used in low light applications, for example, the front faceplate of a car radio, or in the controls attached to the faceplate. Additionally, the low toxicity of the phosphors of formula I and II makes applications such as toys and other commercial or consumer goods a possibility. Furthermore, the long persistence of the phosphors of formula I and II makes them useful for applications in safety apparel, such as hard hats, where the phosphors may be incorporated into the body or into stickers or decals applied to the side, or safety clothing with lettering, where the phosphor may be incorporated either in fibers making up the fabric of clothing or into the lettering.

The phosphors of formula I and II may also be used in safety signage and tape to form informational icons, such as directional arrows, pictograms, or text, when the phosphorescent material becomes the dominant light source upon the removal of ambient light. Thus, the informational icons begin to perceptually "glow" (luminesce) automatically upon failure of the ambient lighting system. The icons may be of a visually simple form, such as directional arrows guiding persons in the proper direction to access to the nearest emergency exit. Alternatively, or additionally, informational icons of such type can be deployed to point out important information, such as emergency evacuation information and directions, the location of fire extinguishers and electrical equipment, personal safety information, and location of life rafts, first-aid kits, communications terminals, or other emergency equipment. The phosphorescent material may also be used to demarcate the outlines and intersections of building structures, such as walls, stairs, etc. Informational icons may be formed in the text of any written language(s), or alternatively may be multi-lingual in character. Alternatively, or additionally, the informational icons may include any of the international standard pictograms, which convey information entirely through outline/area, and do not rely on color or text. Any of the aforementioned informational icons may be formed in a "positive" or "negative" manner, i.e., the icon can be defined by the presence of phosphorescent material against a background void of photoluminescence, or the icon can be defined by the absence of photoluminescence against a background containing the phosphorescent material.

The phosphors of formula I and II may be also be used in lighting systems for emergency egress. Such lighting systems can be used to provide lighting in stairwells, fire escapes, hallways, exits, and elevators and provide sufficient light in the event of a power failure to allow for safe and orderly exit from dark areas. The lighting systems include a light source and at least one phosphor of formula I or II radiationally coupled to the light source. Radiationally coupled means that the elements are associated with each other so radiation from one is transmitted to the other. Suitable light sources include, but are not limited to, fluorescent tubes, compact fluorescent lamps, LED lamps, and incandescent bulbs. The phosphor may be in direct contact with the light source, or may be physically separated from it, but positioned so that light of sufficient energy falls on the phosphor cause excitation. Thus, the phosphor may be coated over or directly on the light emitting surface of the light source by coating and drying a suspension of the phosphor. The surface on which the phosphor is disposed is typically transparent to allow white light to be transmitted through it. Although not intended to be limiting, in one embodiment, the median particle size of the phosphor may range from about 1 to about 20 microns. In a non-limiting example, the phosphors of formula I and II may be coated onto a surface of a fluorescent tube. The phosphors may be coated on the inside or outside surface of the tube. The phosphor of formula I and II may be coated on the entire inside or outside surface of the tube or on only a smaller portion of the inside or outside surface. In another example, the phosphors may be contained in a film formed into a sleeve surrounding the fluorescent tube.

The applications above are but a few examples of embodiments of formula I and II and are not intended to limit its application to those uses. Those skilled in the art will recognize that a long lived persistent phosphor may be useful in a large variety of applications beyond the ones listed above. For example, the material may be used as a phosphor in a cathode ray tube, in a plasma display device, in a liquid crystal display (LCD). The phosphors may also be used in a LED lamp or fluorescent lamp to produce white light, having a desired correlated color temperature (CCT) and color rendering index (CRI). These uses are meant to be merely exemplary and not exhaustive.

The persistent phosphor, which may comprise one or more persistent phosphors and/or one or more persistent phosphor blends may be applied on a structure, integrated in the structure, and/or be integrated in a coating on the structure. In an embodiment, the coating may be a paint. In another embodiment, the structure may be made of a resin. Similarly, the phosphor(s) or phosphor blend(s) may be incorporated in the resin.

Figure 27A:
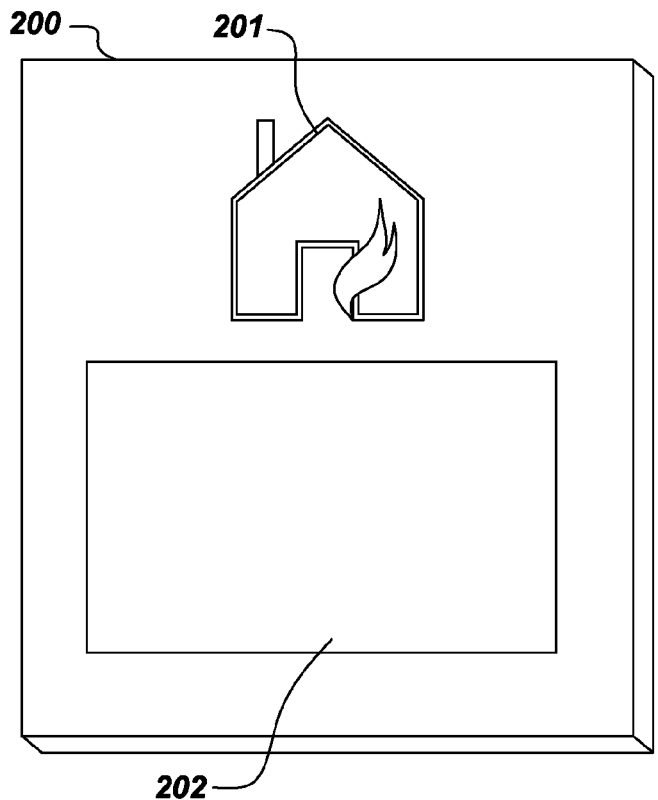
FIGS. 27A-27C are views of articles using persistent phosphors, in accordance with embodiments of the present invention.
Figure 27B:
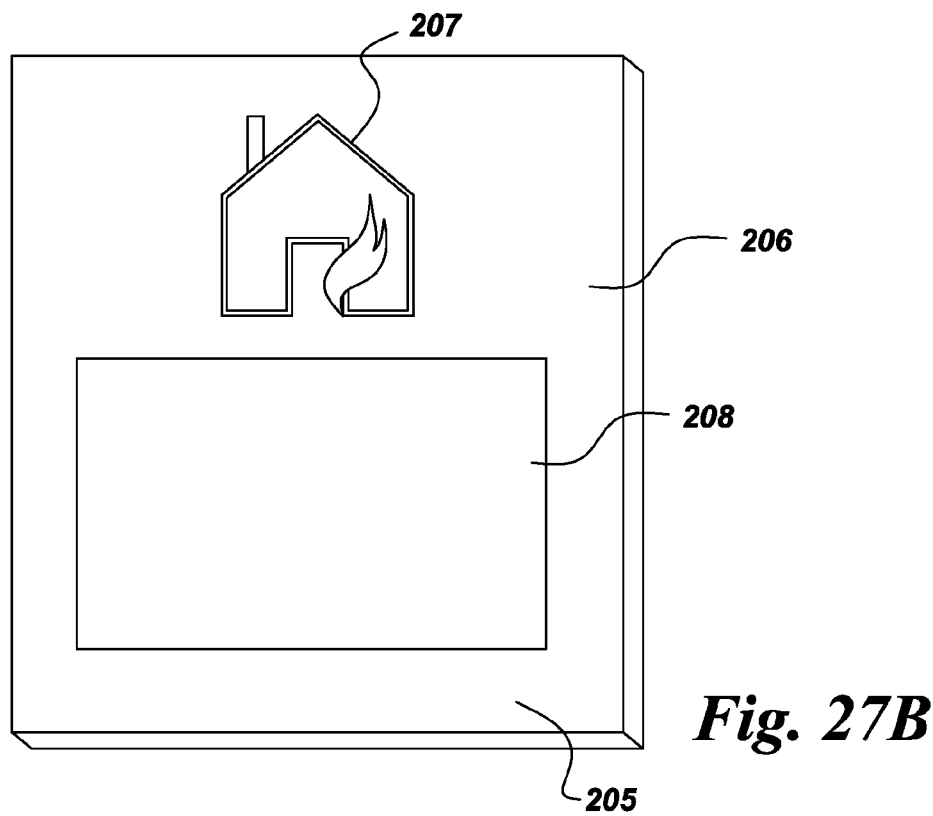
Figure 27C:
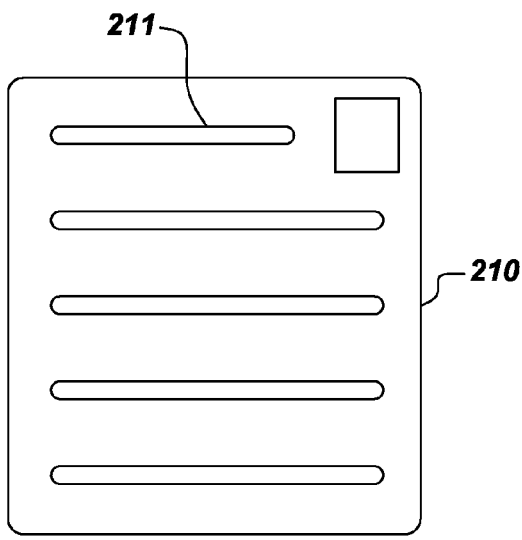

Referring to FIGS. 27A-27C, various uses of a phosphor with an article are shown. For example, FIGS. 27A and 27B respectively show fire call boxes 200 and 206 from a fire system. In FIG. 27A, the fire call box 200 has both a visual indicator 201 and/or signage 202 that has at least one of the aforementioned phosphor(s) and/or phosphor blend(s) incorporated therein or thereon. Similarly, FIG. 27B shows a fire call box 206 that includes a visual indicator 207 and/or signage 208. In this embodiment, the background 205 that has at least one of the aforementioned phosphor(s) and/or phosphor blend(s) incorporated therein or thereon. FIG. 27C shows a card access reader from a security system that includes a background structure 210 and a reading device 211 thereon. Either the background structure 210 and/or the reading device 211 have incorporated therein and/or thereon at least one of the aforementioned phosphor(s) and/or phosphor blend(s).

Figure 28:
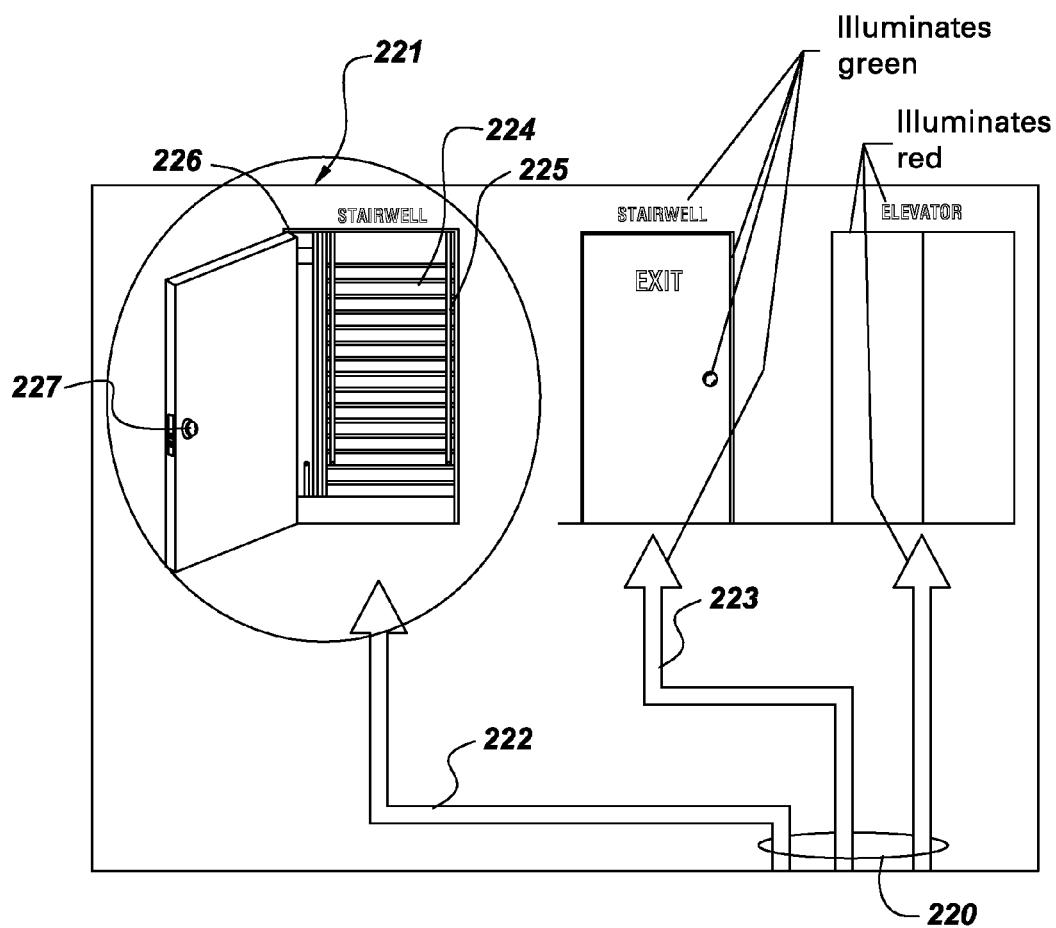
FIG. 28 is view of diagram showing articles using persistent phosphors, in accordance with embodiments of the present invention.

One of ordinary skill in the art will clearly recognize that other articles may use the phosphor(s) and/or phosphor blend(s) such as a sensor, a panel, an access device, a sounder, a fire call box, an access card reader, and the like. Other uses of the phosphor(s) and/or phosphor blend(s) may include ancillary uses to the fire and/or security systems. For example, signage or indicia (egress paths, egress items, etc.) related to the fire and/or security systems may employ the phosphor and/or phosphor blends of the present invention. FIG. 28 shows a diagrammatic view of an interior portion of a building using aspects of the present invention. As shown, in order to aid occupants and/or emergency personnel in the event of an emergency at least one of the aforementioned phosphor(s) and/or phosphor blend(s) may be used to illuminate egress paths 220. For example, egress paths 222, 223 show appropriate egress through doorway 226 to exit stairwell 221. Other ancillary articles that can use the phosphor(s) and/or phosphor blend(s) may include a door knob or panic bar 227, stair nosings or risers 224, stair railings 225 and the like.

Another aspect of the present invention is that a particular color (or group or range of colors) may be employed to provide an indicia of a function of the particular structure. For example, as shown in FIG. 28, the aforementioned items may be colored using a green colored persistent phosphor and/or phosphor blends providing an indication that, in an event of an emergency, exiting via the stairwell is desired. Contrastingly, red-colored persistent phosphor and/or phosphor blends may be used at or in the path to the elevator so as to provide an indication, an event of an emergency, exiting via the elevator is not desired. In this manner, increased visibility of safety (e.g., fire, security, etc.) hardware and building access devices is provided.

Therefore, according to one embodiment of the present invention, an article of manufacture comprises: a structure, wherein the structure is one selected from a group consisting of: a security system device, a portion of a security system device, a fire system device and a portion of fire system device; at least one of a persistent phosphor and a persistent phosphor blend, wherein the persistent phosphor and the persistent phosphor blend is one of: integrated in a coating on the structure; applied on the structure; and integrated in the structure, wherein the persistent phosphor comprises at least one of a first phosphor and a second phosphor and the persistent phosphor blend comprises at least one of a first persistent phosphor blend and a second persistent phosphor blend, wherein the first phosphor is at least one of: a phosphor selected from phosphors of formula I and phosphors of formula II; $M^1F_2$-$M^1S$:$Eu^{2+}$, $Ln^{3+}$(I); $M^2_2M^3_3O_2X_2$:$Eu^{2+}$, $Ln^{3+}$ (II), wherein $M^1$ is Ba, Sr, Ca, Zn, Mg, or a combination thereof; $M^2$ is Ba, Sr, Ca, Mg, Zn, or a combination thereof; M.sup.3 is Al, Ga, B, In, or a combination thereof; X is F, Cl, Br, I, or a combination thereof; and Ln is Dy, Yb, Tm, Er, Ho, Sm, Nd, or a combination thereof; and wherein the second phosphor comprises a general formula of A.sub.x-y-z Al.sub.2-m-n-o-pO.sub.4:Eu.sub.y, RE.sub.z, B.sub.m, Zn.sub.n, Co.sub.o, Sc.sub.p wherein: A may be Ba, Sr, Ca, or a combination of these metals; x is between about 0.75 and 1.3; y is between about 0.0005 and 0.1; z is between about 0.0005 and 0.1; m is between about 0.0005 and 0.30; n is between about 0.0005 and 0.10; o is between about 0 and 0.01; p is between about 0 and 0.05; and RE is Dy, Nd, or a combination thereof; and wherein the first persistent phosphor blend comprises: at least one persistent phosphor; and at least one other persistent phosphor, where an excitation spectrum of the at least one other persistent phosphor partially overlaps an emission spectrum of the at least one persistent phosphor; and wherein the second persistent phosphor blend comprises: at least one persistent phosphor comprising a composition selected from the group consisting of: a) a composition having a general formula A.sub.x-y-zAl.sub.2-m-n-o-pO.sub.4:Eu.sub.y, Dy.sub.z, B.sub.m, Zn.sub.n, Co.sub.o, Sc.sub.p, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula A.sub.x-y-zAl.sub.2-m-n-o-pO.sub.4:Eu.sub.y, Nd.sub.z, B.sub.m, Zn.sub.n, Co.sub.o, Sc.sub.p, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05; and at least one other phosphor, wherein the excitation spectrum of the at least one other phosphor partially overlaps the emission spectrum of the persistent phosphor. In an embodiment where the structure is chosen to be a portion of a security system or a portion of a fire system, as discussed above, the portion of the security system device or the portion of the fire system device can comprise glass.

The present invention has been described in terms of but a few embodiments, and it is recognized that equivalents, alternatives, and modifications, aside from those expressly stated, are possible and within the scope of the appending claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An article of manufacture comprising:
a structure, wherein the structure is one selected from a group consisting of: a security system device, a portion of a security system device, a fire system device and a portion of fire system device;
at least one of a persistent phosphor and a persistent phosphor blend, wherein the persistent phosphor and the persistent phosphor blend is one of:
integrated in a coating on the structure;
applied on the structure; and
integrated in the structure,
wherein the persistent phosphor comprises a first phosphor and optionally a second phosphor and the persistent phosphor blend comprises a first persistent phosphor blend and optionally a second persistent phosphor blend,
wherein the first phosphor is at least one of:
a phosphor selected from phosphors of formula I and phosphors of formula II;

$$M^1F_2\text{-}M^1S:Eu^{2+},Ln^{3+} \quad (I)$$

$$M^2_3M^3_2O_5X_2: Eu^{2+},Ln^{3+} \quad (II)$$

wherein
$M^1$ is Ba, Sr, Ca, Zn, Mg, or a combination thereof;
$M^2$ is Ba, Sr, Ca, Mg, Zn, or a combination thereof;
$M^3$ is Al, Ga, B, In, or a combination thereof;
X is F, Cl, Br, I, or a combination thereof; and
Ln is Dy, Yb, Tm, Er, Ho, Sm, Nd, or a combination thereof; and
wherein the second phosphor comprises a general formula of $A_{x-y-z}Al_{2-m-n-o-p}O_4:Eu_y, RE_z, B_m, Zn_n, Co_o, Sc_p$ wherein:
A is Ba, Sr, Ca, or a combination of these metals;
X is between about 0.75 and 1.3;
y is between about 0.0005 and 0.1;
z is between about 0.0005 and 0.1;
m is between about 0.0005 and 0.30;
n is between about 0.0005 and 0.10;
o is between about 0 and 0.01;
p is between about 0 and 0.05; and
RE is Dy, Nd, or a combination thereof; and
wherein the first persistent phosphor blend comprises:
the persistent phosphor; and
at least one other persistent phosphor, where an excitation spectrum of the at least one other persistent phosphor partially overlaps an emission spectrum of the persistent phosphor; and
wherein the second persistent phosphor blend comprises:
at least one second persistent phosphor comprising a composition selected from the group consisting of:
a) a composition having a general formula $A_{x-y-z}Al_{2-m-n-o-p}O_4:Eu_y, Dy_z, Bm, Zn_n, Co_o, Sc_p$, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and
b) a composition having general formula $A_{x-y-z}Al_{2-m-n-o-p}O_4:Eu_y, Nd_z, Bm, Zn_n, Co_o, Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05; and
at least one third phosphor, wherein the excitation spectrum of the at least one third phosphor partially overlaps the emission spectrum of the second persistent phosphor.

2. The article of manufacture of claim 1, wherein the security device is one of a sensor, a panel, an access device, and combinations thereof.

3. The article of manufacture of claim 1, wherein the fire system device is one of, a fire call box, a panel, a sensor, a sounder, and combinations thereof.

4. The article of manufacture of claim 1, wherein the coating is a paint.

5. The article of manufacture of claim 1, wherein the structure comprises a resin.

6. The article of manufacture of claim 5, wherein the integrated in the structure comprises incorporating the persistent phosphor in the resin.

7. The article of manufacture of claim 1, wherein the portion comprises glass.

8. The article of manufacture of claim 1, wherein the portion comprises signage.

9. The article of manufacture of claim 1, wherein a color of the persistent phosphor provides an indicia of a function of the structure.

\* \* \* \* \*